(12) United States Patent
Cheekatla et al.

(10) Patent No.: US 12,375,906 B2
(45) Date of Patent: Jul. 29, 2025

(54) FIND/VERIFY UE PROVIDED LOCATION BY NTN NETWORKS

(71) Applicant: QUALCOMM Incorporated, San Diego, CA (US)

(72) Inventors: Phaneendra Cheekatla, Hyderabad (IN); Vikrant Singh, Hyderabad (IN); Athri Rao, Shimoga (IN); Keerthi Chowdary V, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 18/157,724

(22) Filed: Jan. 20, 2023

(65) Prior Publication Data

US 2024/0251237 A1   Jul. 25, 2024

(51) Int. Cl.
*H04W 12/104* (2021.01)
*H04W 12/037* (2021.01)

(52) U.S. Cl.
CPC ....... *H04W 12/037* (2021.01); *H04W 12/104* (2021.01)

(58) Field of Classification Search
CPC . H04W 12/037; H04W 12/104; H04W 12/03; H04W 12/10
See application file for complete search history.

(56) References Cited

U.S. PATENT DOCUMENTS

| | | | | |
|---|---|---|---|---|
| 8,712,051 | B2 * | 4/2014 | Psiaki | G01S 19/05 380/255 |
| 10,683,083 | B1 * | 6/2020 | Baltrusch | B64F 1/20 |
| 2014/0012674 | A1 * | 1/2014 | Piccionielli | H01M 8/0662 705/14.55 |
| 2014/0013420 | A1 * | 1/2014 | Picionielli | G06F 21/60 726/17 |
| 2015/0171917 | A1 * | 6/2015 | Turner | H04B 1/707 375/147 |
| 2016/0011318 | A1 * | 1/2016 | Cohen | G01S 19/05 342/357.68 |
| 2019/0113625 | A1 * | 4/2019 | Farmer | G01S 19/072 |
| 2020/0132858 | A1 * | 4/2020 | Viswanathan | G01S 19/426 |
| 2020/0204340 | A1 * | 6/2020 | Curran | H04L 9/0852 |
| 2020/0371246 | A1 * | 11/2020 | Marmet | G01S 5/0009 |
| 2021/0314901 | A1 * | 10/2021 | Issakov | G01S 5/0221 |
| 2023/0358843 | A1 * | 11/2023 | Ghimire | H04W 12/104 |
| 2023/0374757 | A1 * | 11/2023 | Lee | E02F 9/26 |

FOREIGN PATENT DOCUMENTS

| | | | | |
|---|---|---|---|---|
| EP | 2584378 A1 * | 4/2013 | | G01S 19/11 |
| EP | 2682785 A1 * | 1/2014 | | G01S 19/215 |

* cited by examiner

*Primary Examiner* — Lynn D Feild
*Assistant Examiner* — Abdullah Almamun
(74) *Attorney, Agent, or Firm* — Thien T. Nguyen

(57) ABSTRACT

Aspects presented herein may enable a UE to communicate with a non-terrestrial network (NTN) with its location verified using a set of encrypted signals from a set of satellites associated with the NTN. In one aspect, a UE receives, from each satellite of a set of satellites, a set of encrypted signals and time information. The UE generates a set of time signals based on the time information for all of the set of satellites. The UE transmits the set of encrypted signals and the generated set of time signals for verifying a location of the UE. The UE communicates with an NTN based on the location of the UE being verified by the NTN to be a valid location, where the set of satellites is associated with the NTN.

30 Claims, 17 Drawing Sheets

FIND/VERIFY UE PROVIDED LOCATION BY NTN NETWORKS

TECHNICAL FIELD

The present disclosure relates generally to communication systems, and more particularly, to a wireless communication involving a non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from each satellite of a set of satellites, a set of encrypted signals and time information. The apparatus generates a set of time signals based on the time information for all of the set of satellites. The apparatus transmits the set of encrypted signals and the generated set of time signals for verifying a location of the UE.

In an aspect of the disclosure, a method, a computer-readable medium, and an apparatus are provided. The apparatus transmits, for a user equipment (UE) via a set of satellites, a set of encrypted signals. The apparatus receives, from the UE, the set of encrypted signals and a set of time signals generated based on time information associated with the set of satellites. The apparatus verifies a location of the UE based on the set of encrypted signals and the set of time signals.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
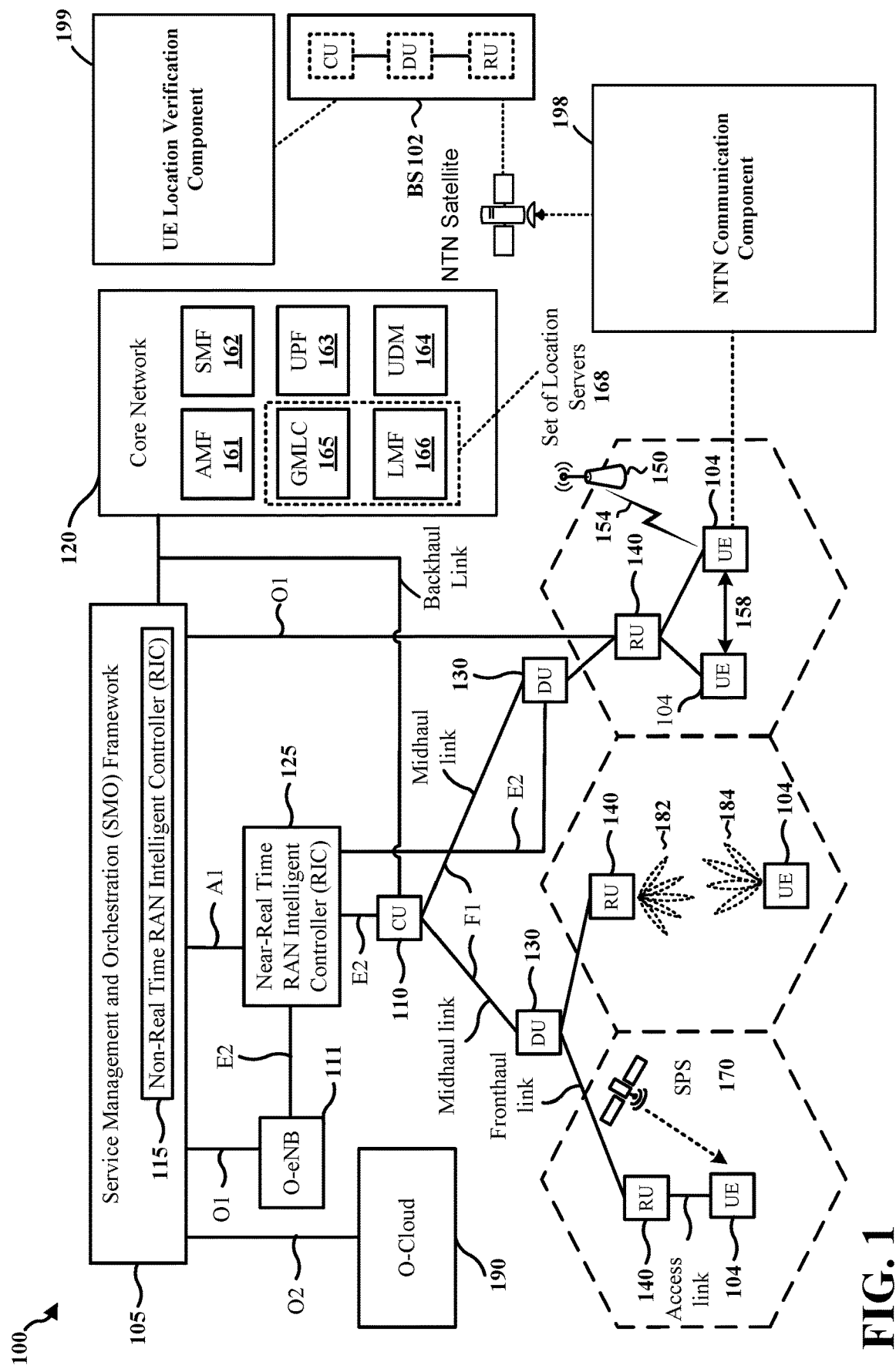
FIG. 1 is a diagram illustrating an example of a wireless communications system and an access network.

Aspects presented herein provide a set of mechanisms for a network entity (e.g., a non-terrestrial network (NTN)) to reliably verify the location provided by a UE and/or to determine the location of the UE, thereby preventing a UE from accessing a network based on an inaccurate/fake location. As fraud may happen due to malicious users, aspects presented herein may enable UE location information to be verifiable by a network entity. For example, in an NTN, one satellite may serve multiple core networks belong to different countries and operators. Thus, the NTN may have specifications to use a core network of public land mobile network (PLMN) in a country where a UE to be served is physically located. However, most NTNs may rely heavily on the location determination feature via positioning technology such as global navigation satellite system (GNSS) to address their use cases, which may include charging information for various countries/region, barring of services based on specific country/region, and/or security related enforcements based on the country/region rules, etc. As such, the location data/information of the UE may be specified to be credible and the network may be specified to have the capability to calculate or verify a UE location with high accuracy and reliability.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements.

For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an NTN communication component 198 that may be configured to receive, from each satellite of a set of satellites, a set of encrypted signals and time information; generate a set of time signals based on the time information for all of the set of satellites; and transmit the set of encrypted signals and the generated set of time signals for verifying a location of the UE.

In certain aspects, the base station 102 may have a UE location verification component 199 that may be configured to transmit, for a UE via a set of satellites, a set of encrypted signals; receive, from the UE, the set of encrypted signals and a set of time signals generated based on time information associated with the set of satellites; and verify a location of the UE based on the set of encrypted signals and the set of time signals.

Figure 2:
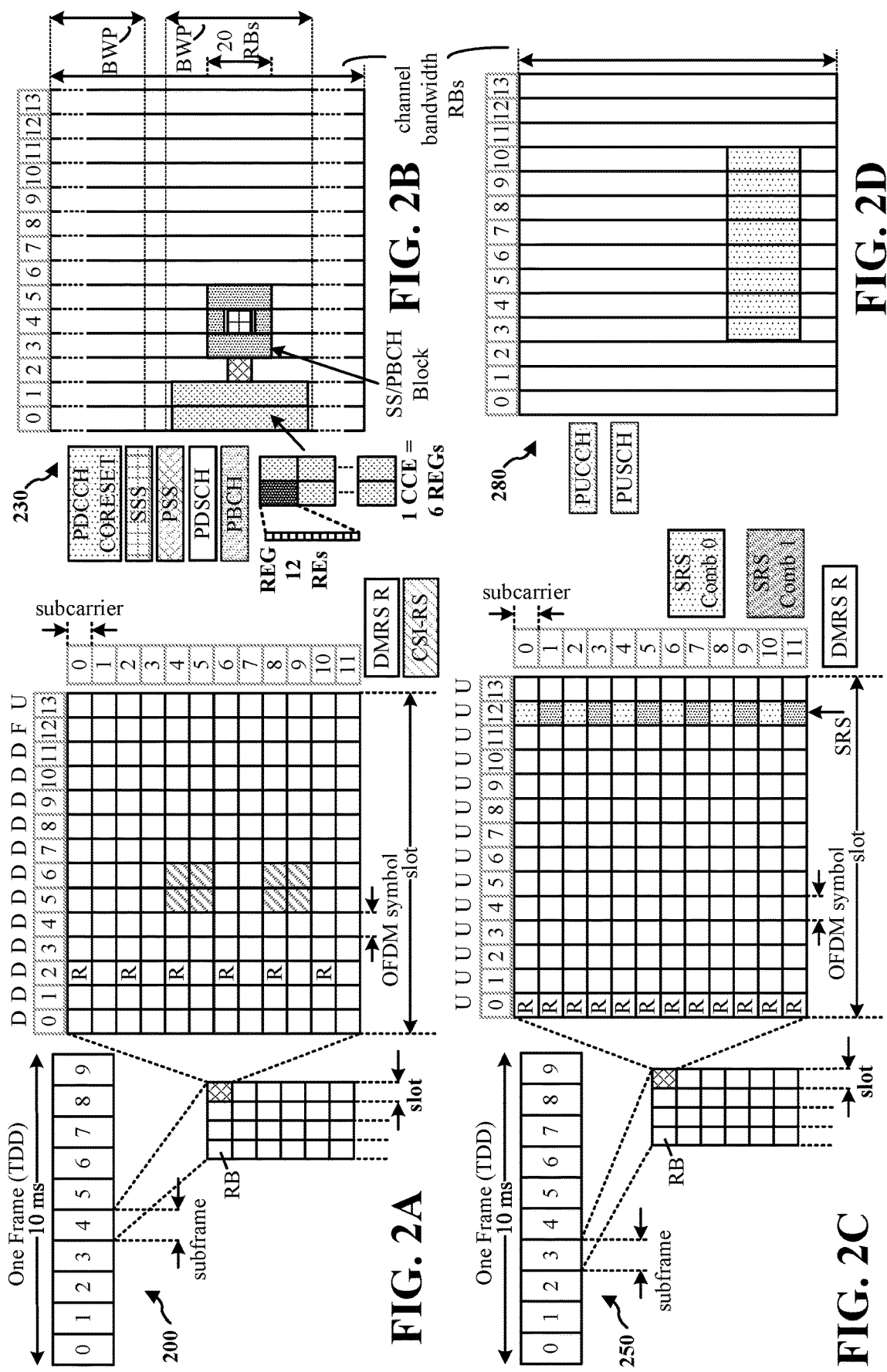
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
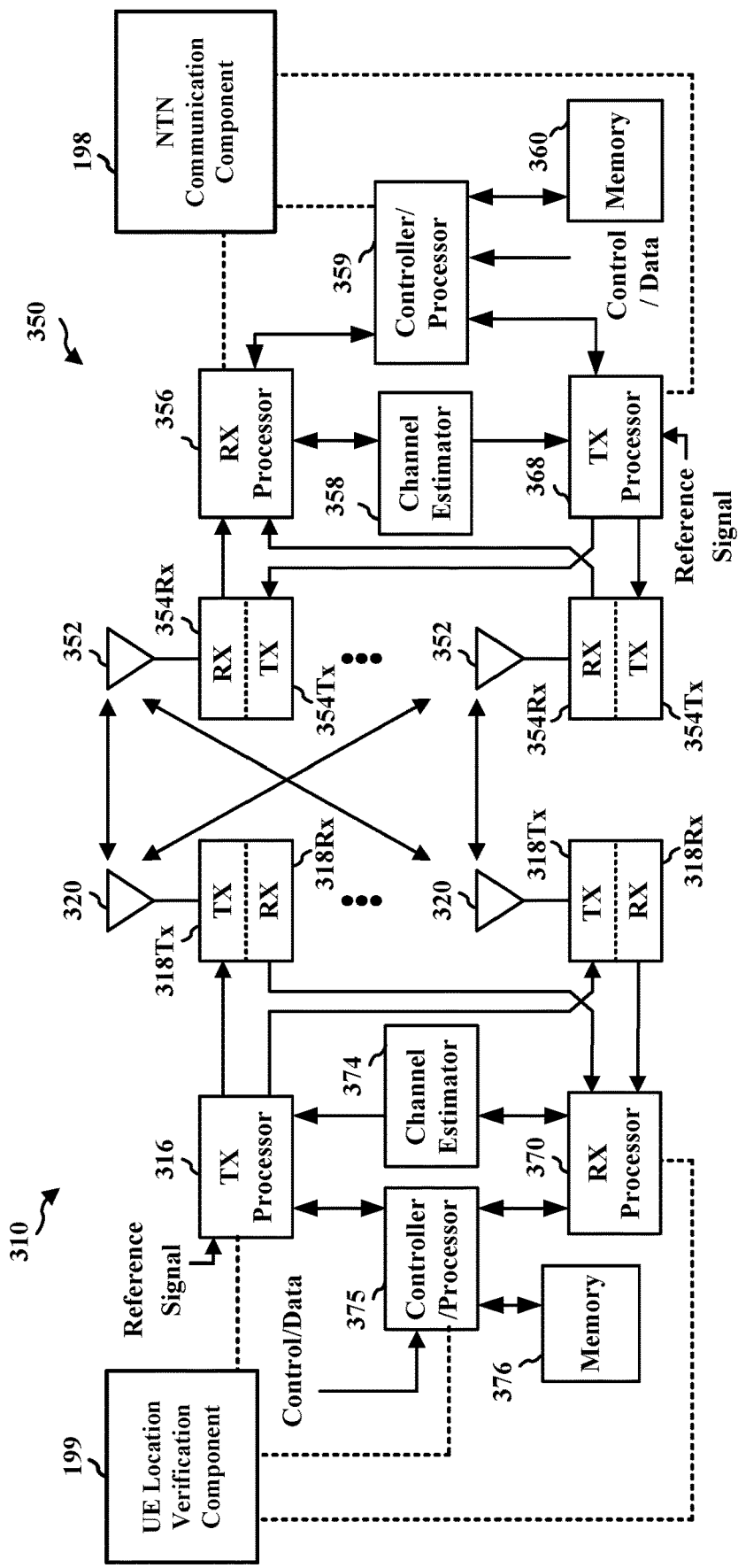
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the NTN communication component 198 of FIG. 1.

At least one of the TX processor 316, the RX processor 370, and the controller/processor 375 may be configured to perform aspects in connection with the UE location verification component 199 of FIG. 1.

Figure 4:
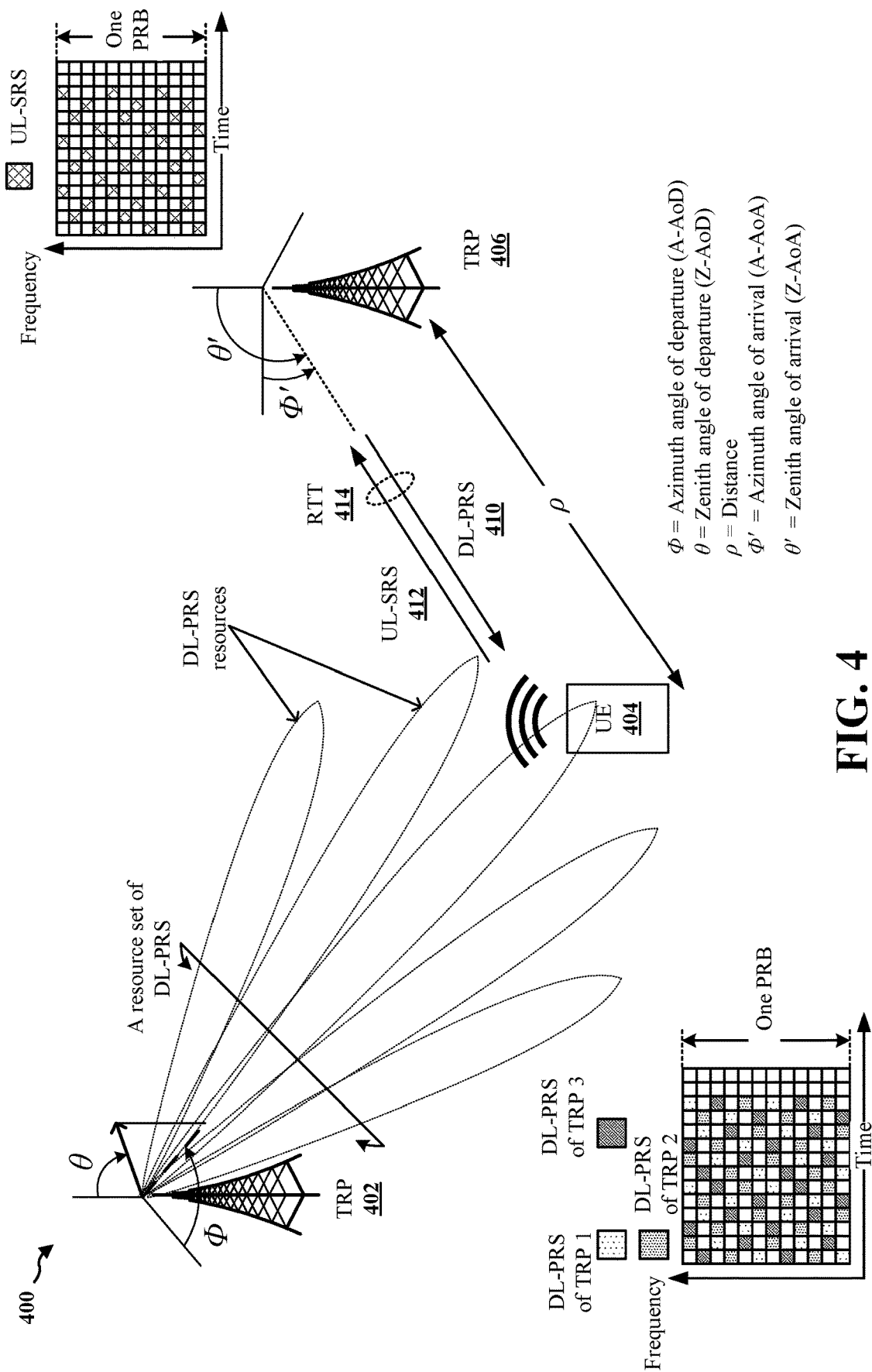
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $||T_{SRS\_RX} - T_{PRS\_TX}| - |T_{SRS\_TX} - T_{PRS\_RX}||$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AOD and/or DL-AoA. Note that data/measurements from various technologies may be combined in various ways to to determine and/or to enhance certainty, to increase accuracy, supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

A UE may communicate with a network entity that is non-terrestrial, which may be referred to as a non-terrestrial network (NTN). An NTN may refer to a network, or segments of a network, using at least one airborne device (e.g., an aircraft) or satellite (e.g., a low earth orbit (LEO) satellite, a medium earth orbit (MEO) satellite, a geostationary earth orbit (GEO) satellite, a high elliptical orbit (HEO) satellite, and/or a high-altitude pseudo satellite (HAPS), etc.) for communication (e.g., for transmitting data or receiving data). For example, an NTN may support a direct communication between a UE (e.g., a handset, a mobile phone, etc.) and a satellite (e.g., a LEO satellite, a GEO satellite, etc.), where the UE may transmit data (e.g., text messages and/or voice services, etc.) to another UE via the satellite. For purposes of the present disclosure, an NTN may include just NTN cell(s), or a mix of NTN cell(s) and ground cell(s). As such, for a positioning operation associated with an NTN, the positioning operation may involve NTN cell(s) without ground cell(s), a mix of NTN and ground cells, and/or hybrid solutions involving NTN cells, ground cells, GNSS satellites, and/or other ground-based positioning reference points such as WiFi, Bluetooth, etc.

In some aspects, determining/knowing a position of a UE may be an important factor for an NTN. For example, location information of a UE may be used in a random access network (RAN) for an initial synchronization, uplink timing and frequency pre-compensation, mobility, and/or handover, etc. In addition, an NTN may support different types of UEs, such as UEs with global navigation satellite system (GNSS) support (e.g., the positions of the UEs may be determined via global positioning system (GPS)) and/or UEs without GNSS support. In some examples, it may be advantageous for a UE to perform a positioning session with an NTN as the NTN may enable the UE to interact with the satellite(s). For example, the PRS signals transmitted from a satellite may be tailored to or configured for a specific UE. As such, the performance and/or the accuracy of a positioning of a UE based on GNSS may further be supplemented with the assistance of an NTN as the UE and/or the satellite may exchange positioning related information with each other.

Figure 5:
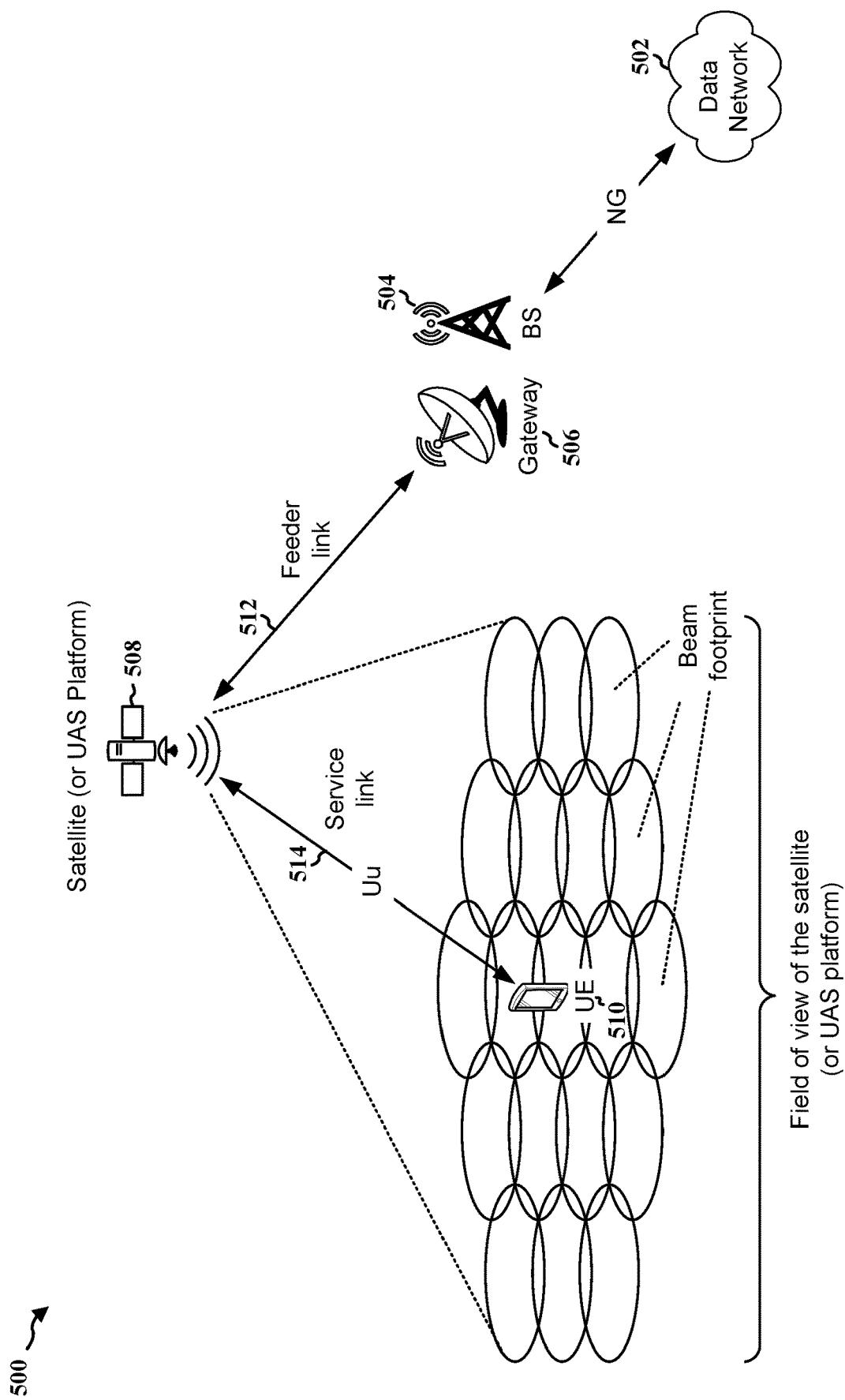
FIG. 5 is a diagram illustrating an example of a non-terrestrial network (NTN) architecture based on a transparent payload in accordance with various aspects of the present disclosure.

FIG. 5 is a diagram 500 illustrating an example of an NTN architecture based on a transparent payload in accordance with various aspects of the present disclosure. A data network 502 (e.g., a 5G core (5GC) network) may connect to a base station 504 (e.g., a network entity, an gNB) via a communication interface (e.g., a next generation (NG) interface). The base station 504 may be located on the ground and connected to an NTN gateway 506, where the NTN gateway 506 may be connected to an NTN payload 508 (e.g., a network node embarked onboard a satellite, an unmanned aircraft systems (UAS), or HAPS, etc.) via a feeder link 512. The NTN payload 508 may connect to a UE 510 via a service link 514 (e.g., using the UE-UTRAN (Uu) interface). Under the transparent payload NTN architecture, the base station 504 may be a ground station and the NTN payload 508 (e.g., the satellite) may function like a relay, where the NTN payload 508 may provide radio frequency filtering, frequency conversion, and/or amplification for data/payload received from the base station 504 via the NTN gateway 506 and relay/transmit the data/payload to the UE 510. As such, the waveform or signal relayed/repeated by the NTN payload 508 may be un-changed. In some examples, the ground area(s) covered by the NTN payload 508 may be referred to as "footprint(s)" and/or "beam footprint(s)." The footprint of a satellite may be a ground area in which its transponders offer coverage, and the footprint may also determine the satellite dish diameter for receiving each transponder's signal. In some examples, there may be a different coverage map for each transponder (or group of transponders), as each transponder may be configured to cover different areas. Table 2 below shows examples of altitudes and footprint sizes for different types of satellite platforms, where different satellite platforms may have different distance, delay, and/or coverage on the earth.

TABLE 2 example altitudes and footprint sizes for different types of satellite platforms

| Platforms | Altitude Range | Orbit | Typical Beam Footprint Size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (LEO) satellite | 35786 km | Notional station keeping position fixed in terms of | 200-3500 km |
| UAS platform (including HAPS) | 8-50 km (20 km for HAPS) | elevation/azimuth with respect to a given earth point | 5-200 km |
| High Elliptical Orbit (HEO) satellite | 400-50000 km | Elliptical around the earth | 200-3500 km |

Figure 6:
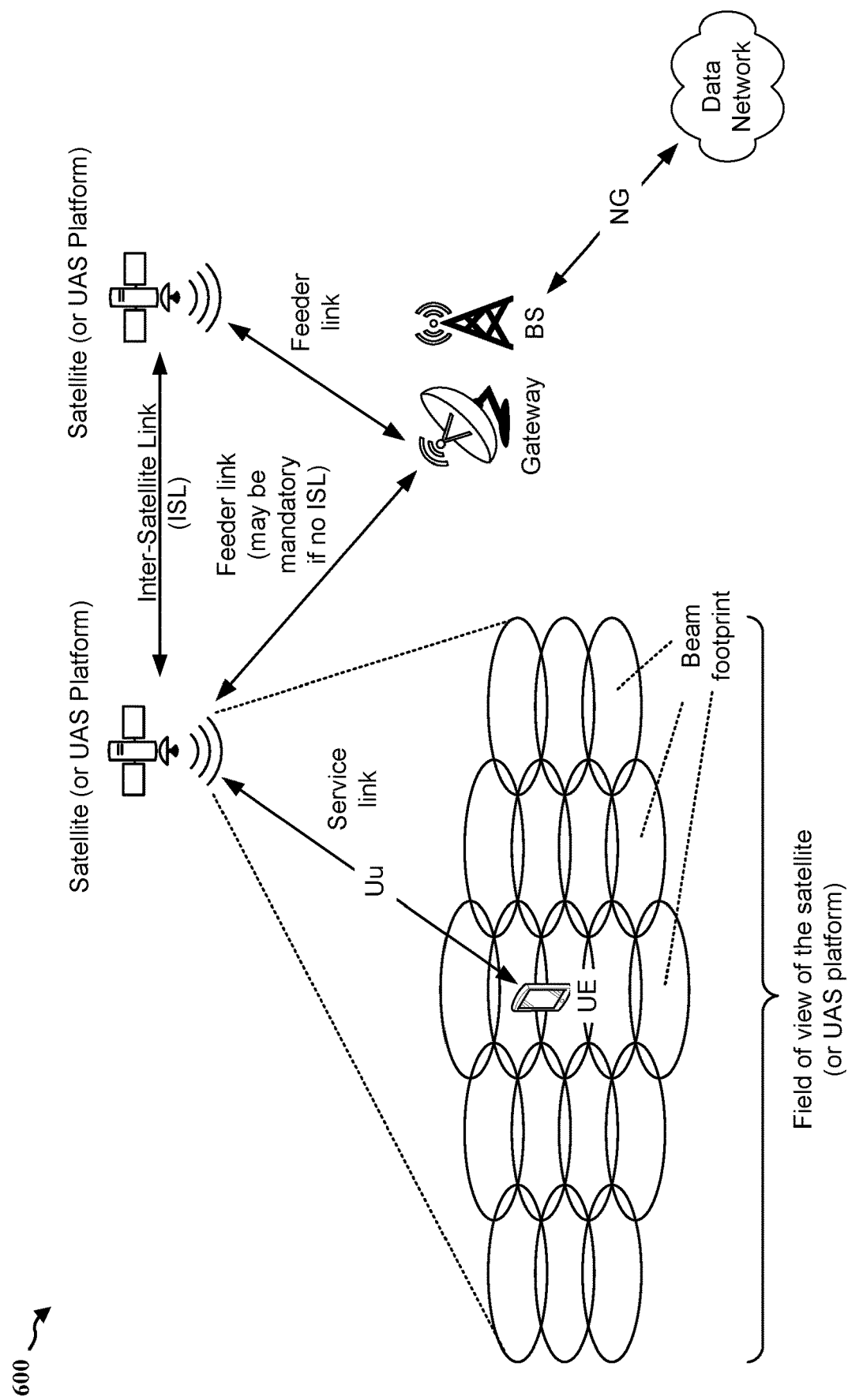
FIG. 6 is a diagram illustrating an example of an NTN architecture based on a regenerative payload in accordance with various aspects of the present disclosure.

FIG. 6 is a diagram 600 illustrating an example of an NTN architecture based on a regenerative payload in accordance with various aspects of the present disclosure. In some examples, an NTN network may include at least one satellite with a regenerative payload, enabling the satellite to be a distributed unit (DU), or a full base station supporting a satellite-enabled new radio, radio access network (NR-RAN). For example, for a satellite with regenerative payload, the satellite may regenerate incoming signals with signal-processing techniques such as demodulation, decoding, switching, encoding, and modulation before transmission, which may improve division of spectrum. In addition, a satellite with a regenerative payload may include on-board processing (e.g., a digital transparent processor (DTP) or a fully regenerative (FR) transponder). In some examples, inter-satellite links (ISLs) may be established between satellites with regenerative payloads for communications, which may increase the geographical coverage of the receiving ground station/user terminal.

Figure 7B:
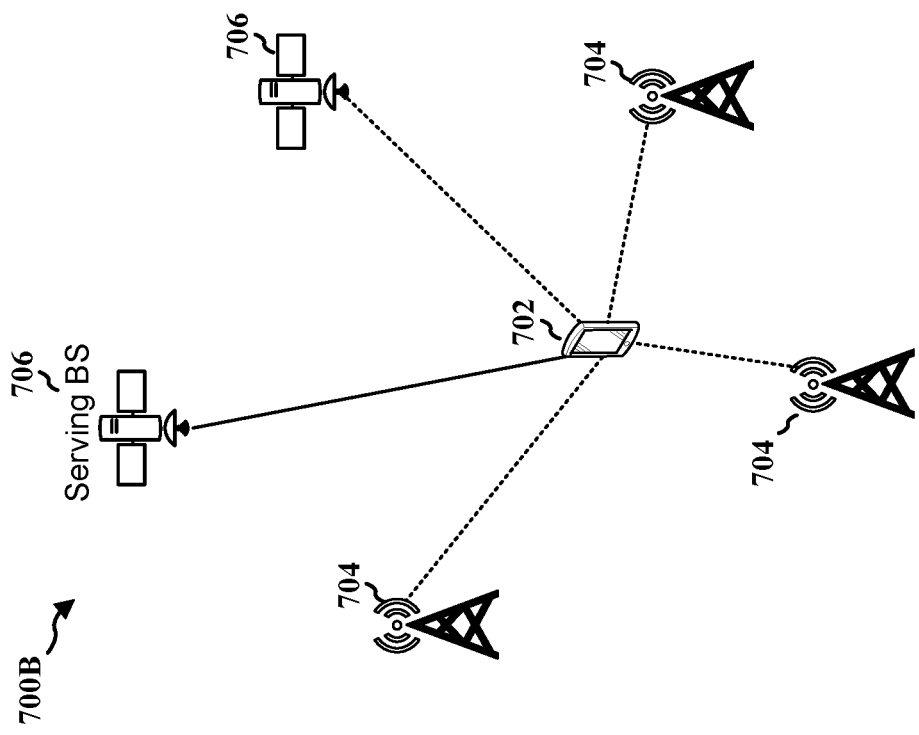
FIG. 7B is a diagram illustrating an example of a network that includes both NTN and TN devices in accordance with various aspects of the present disclosure.
Figure 7A:
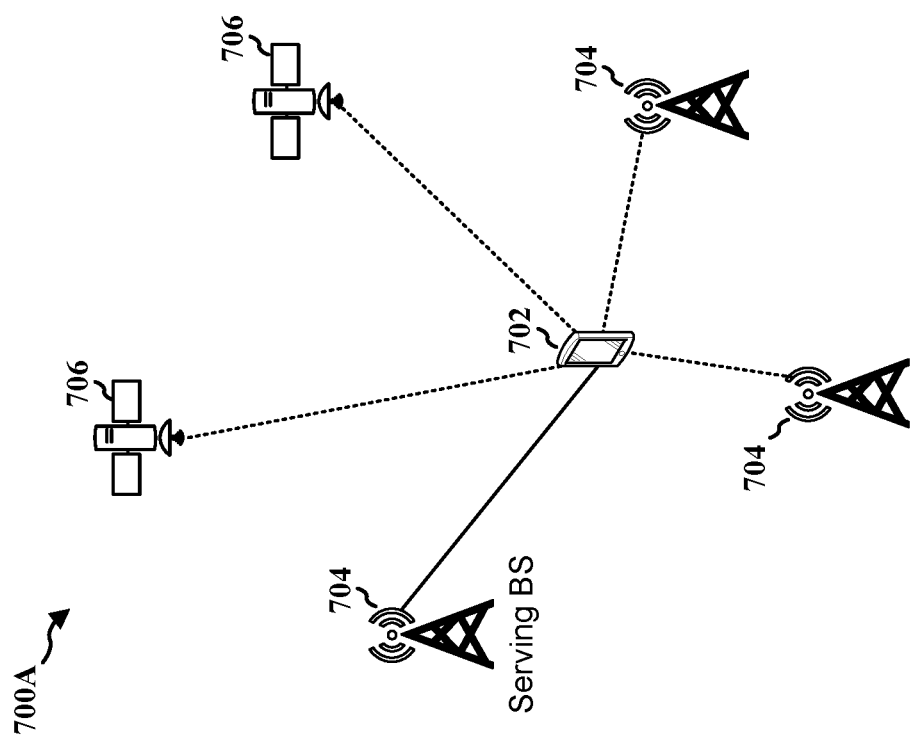
FIG. 7A is a diagram illustrating an example of a network that includes both NTN and TN devices in accordance with various aspects of the present disclosure.

In some examples, a communication network may include both an NTN and a terrestrial network (TN). In other words, a segment of a communication network may include non-terrestrial device(s) (e.g., NTN base stations) and another segment of the communication work may include terrestrial device(s) (e.g., TN/ground base stations). For example, FIGS. 7A and 7B are diagrams 700A and 700B illustrating examples of a network that includes both NTN and TN devices in accordance with various aspects of the present disclosure. A network may include one or more TN devices 704 (e.g., ground base stations and/or TRPs) and one or more NTN devices 706 (e.g., satellites and/or aircrafts), where a UE 702 in a positioning session may transmit or receive signals (e.g., PRSs, SRSs, etc.) with both TN devices 704 and NTN devices 706. In some examples, as shown by the diagram 700A, a serving base station may be a TN base station, such that the UE 702 may connect to the serving base station via a TN network. In other examples, as shown by the diagram 700B, the serving base station may be an NTN satellite base station, such that the UE 702 may connect to the NTN satellite base station via an NTN network. In both scenarios, the assistance data (AD) associated with the UE positioning session may include a mixed of TN and NTN base stations. For purposes of the present disclosure, a base station that is associated with an NTN device (e.g., a satellite, an aircraft, or an UAS platform, etc.) may be referred to as an "NTN base station," an "NTN satellite base station," and/or an "NTN base station satellite." On the other hand, a base station that is located on the earth may be referred to as an "TN base station" and/or a "terrestrial base station."

Each NTN base station may move with different speeds, and the coverage of the NTN base station on the earth may keep on changing. In some examples, the change in the NTN base station may be deterministic and known at an LMF level. For example, Table 3 below shows examples of NTN scenarios versus delay constraints:

TABLE 3

Examples of NTN scenarios versus delay constraints

| NTN scenarios | A GEO transparent payload | B GEO regenerative payload | C1 LEO transparent payload | C2 | D1 LEO regenerative payload | D2 |
|---|---|---|---|---|---|---|
| Satellite altitude | 35786 km | | 600 km | | | |
| Relative speed of Satellite with respect to earth | negligible | | 7.56 km per second | | | |
| Min elevation for both feeder and service links | 10° for service link and 10° for feeder link | | | | | |
| Typical Min/Max NTN beam foot print diameter (note 1) | 100 km/3500 km | | 50 km/1000 km | | | |
| Maximum propagation delay contribution to the Round-Trip Delay on the radio interface between the gNB and the UE | 541.46 ms (Worst case) | 270.73 ms | 25.77 ms | | 12.89 ms | |

TABLE 3-continued

Examples of NTN scenarios versus delay constraints

| NTN scenarios | A<br>GEO<br>transparent<br>payload | B<br>GEO<br>regenerative<br>payload | C1 C2<br>LEO<br>transparent<br>payload | | D1 D2<br>LEO<br>regenerative<br>payload | |
|---|---|---|---|---|---|---|
| Minimum propagation delay contribution to the Round-Trip Delay on the radio interface between the gNB and the UE | 477.48 ms | 238.74 ms | 8 ms | | 4 ms | |
| Maximum Delay variation as seen by the UE (note 2) | | Negligible | Up to +/− 93.0 μs/sec (Worst case) | | Up to +/− 47.6 μs/sec | |

(note 1):
The beam foot print diameter is indicative. The diameter depends on the orbit, earth latitude, antenna design, and radio resource management strategy in a given system.
(note 2):
The delay variation measures how fast the round-trip delay (function of UE-satellite-NTN gateway distance) varies over time when the satellite moves towards/away from the UE. It is expressed in μs/s and is negligible for GEO scenario
NOTE 3:
Speed of light used for delay calculation is 299792458 m/s.

As shown by Table 2 and Table 3, multiple types or combinations of satellite networks may be configured for an NTN, such as GEO satellites, LEO satellites, and HAPS. Compared to TN, NTN network satellite may cover much broader ground area. For example, a TN base station may have a coverage distance (e.g., a transmission/reception (Tx/Rx) range) of approximately 5-8 km, whereas a GEO satellite may have a coverage distance of approximately 100-3500 km and a LEO satellite may have a coverage distance of approximately 50-1000 km, etc. As such, in some scenarios, an NTN satellite may cover multiple countries at a time. However, a network may be specified to serve a UE in a specific country based on that country's policies. Thus, the network may be specified to know the location of the UE. For example, an NTN satellite may have a coverage distance of 2000 km that covers three countries with different network policies, where the NTN satellite may be specified to serve a UE in a first country based on a first network policy, serve a UE in a second country based on a second network policy, and not to serve a UE in a third country, etc.

In some examples, to determine the location of a UE to be served, an NTN may rely on the location information provided by the UE. However, to access an NTN of different regions/countries, a UE (e.g., a fraud/malicious UE) may be configured to provide inaccurate/wrong positioning location to the NTN. For example, a UE that is located within a first country may want to access an NTN associated with a second country or based on the second country's network policy. In some examples, the charging/pricing for accessing a network may also be different for different countries. As such, the UE may report to the NTN that it is located in the second country to gain (e.g., unauthorized) access to the NTN.

Aspects presented herein provide a set of mechanisms for a network entity (e.g., an NTN) to reliably verify the location provided by a UE and/or to determine the location of the UE, thereby preventing a UE from accessing a network based on an inaccurate/fake location. As fraud may happen due to malicious users, aspects presented herein may enable UE location information to be verifiable by a network entity. For example, in an NTN, one satellite may serve multiple core networks belong to different countries and operators. Thus, the NTN may have specifications to use a core network of public land mobile network (PLMN) in a country where a UE to be served is physically located. However, most NTNs may rely heavily on the location determination feature via positioning technology such as GNSS to address their use cases, which may include charging information for various countries/region, barring of services based on specific country/region, and/or security related enforcements based on the country/region rules, etc. As such, the location data/information of the UE may be specified to be credible and the network may be specified to have the capability to calculate or verify a UE location with high accuracy and reliability.

Figure 8:
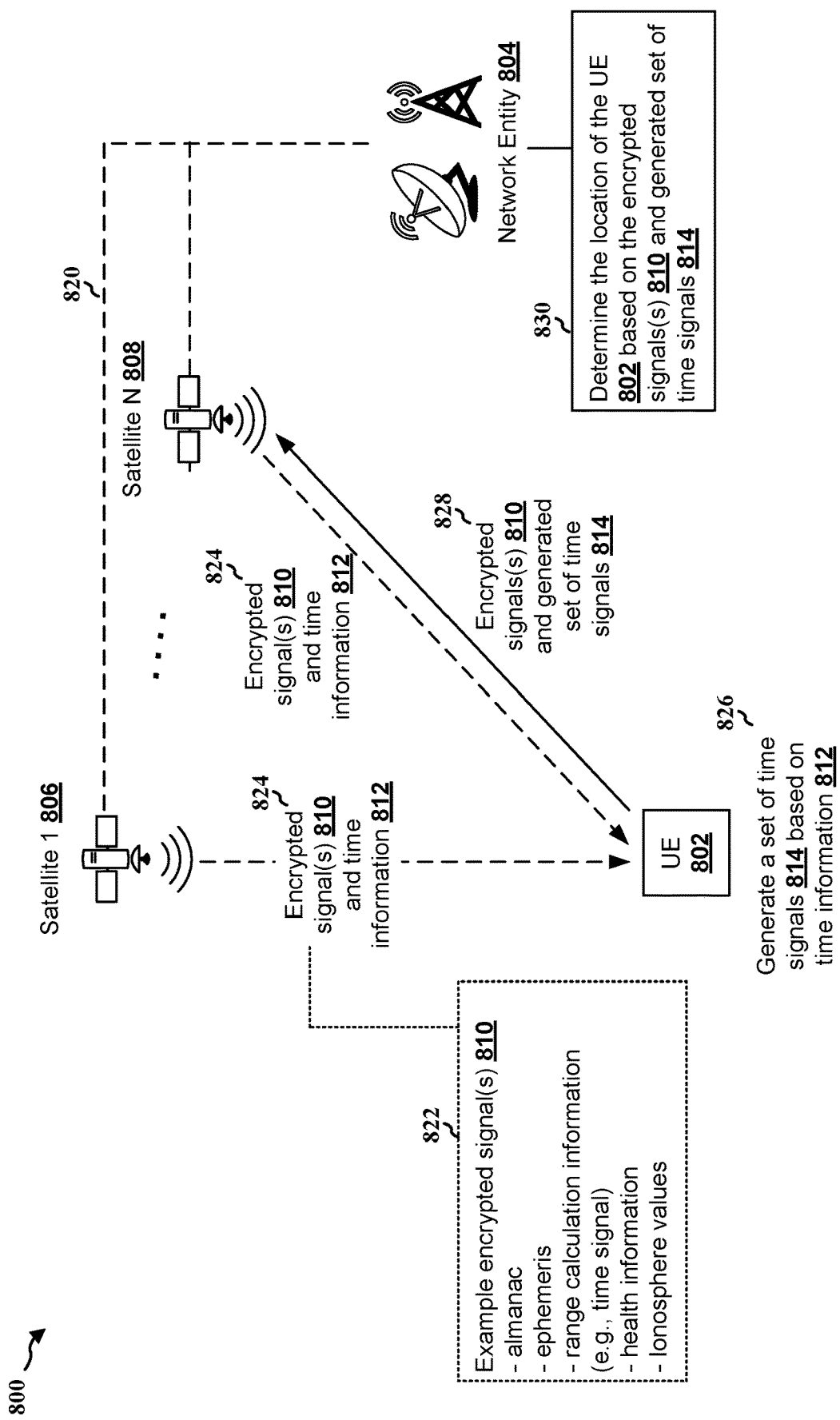
FIG. 8 is a diagram illustrating an example of an NTN determining/verifying a location of a UE based on sending encrypted sequences/signals from a set of satellites in accordance with various aspects of the present disclosure.

FIG. 8 is a diagram 800 illustrating an example of an NTN determining/verifying a location of a UE based on sending encrypted sequences/signals from a set of satellites in accordance with various aspects of the present disclosure. In one aspect of the present disclosure, a network may send encrypted sequence(s) from a set of satellites, where the encrypted sequence(s) may include encrypting one or more of almanac, ephemeris, range calculation information, health information, and/or ionosphere values associated with each satellite in the set of satellites. The UE may receive the encrypted sequence(s) from the set of satellites (e.g., four or more satellites), and the UE may generate its time signals based on time information (e.g., unencrypted) of the set of satellites. Then, the UE may send in uplink all the specified information (including the encrypted sequences and the generated time signals) to the network for the network to calculate the position of the UE. The satellites may be LEO satellite(s), GEO satellite(s), HAPS satellites(s), or a combination thereof.

For example, as shown at 820, a network entity 804 may be configured to transmit encrypted signal(s) 810 via a set of satellites (or configured the set of satellites to transmit encrypted signal(s) 810), which may include a first satellite 806 and up to an $N^{th}$ satellite 808. In some examples, as shown at 822, the encrypted signal(s) 810 may be based on applying an encryption to: an almanac data, an ephemeris data, range calculation information, a set of time signals, health information, and/or a set of ionosphere values associated with each satellite. The encrypted signal(s) 810 may prevent the UE 802 from manipulating signals received from the set of satellites. Then, as shown at 824, each satellite in the set of satellites may transmit/broadcast the encrypted signal(s) 810 and its corresponding time information 812 (e.g., unencrypted time information). For purposes of the present disclosure, the almanac data of a satellite may refer to a coarse position of the satellite, and the ephemeris data of a satellite may refer to a precise position of the satellite.

A UE equipped with a global navigation satellite system (GNSS) receiver (which may include the Global Positioning System (GPS) receiver) may determine its location based on GNSS positioning (e.g., based on trilateration). GNSS is a network of satellites broadcasting timing and orbital information used for navigation and positioning measurements. GNSS may include multiple groups of satellites, known as constellations, that broadcast signals (which may be referred to as GNSS signals) to control stations and users of the GNSS. Based on the broadcast signals, the users may be able to determine their locations (e.g., via a trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 9:
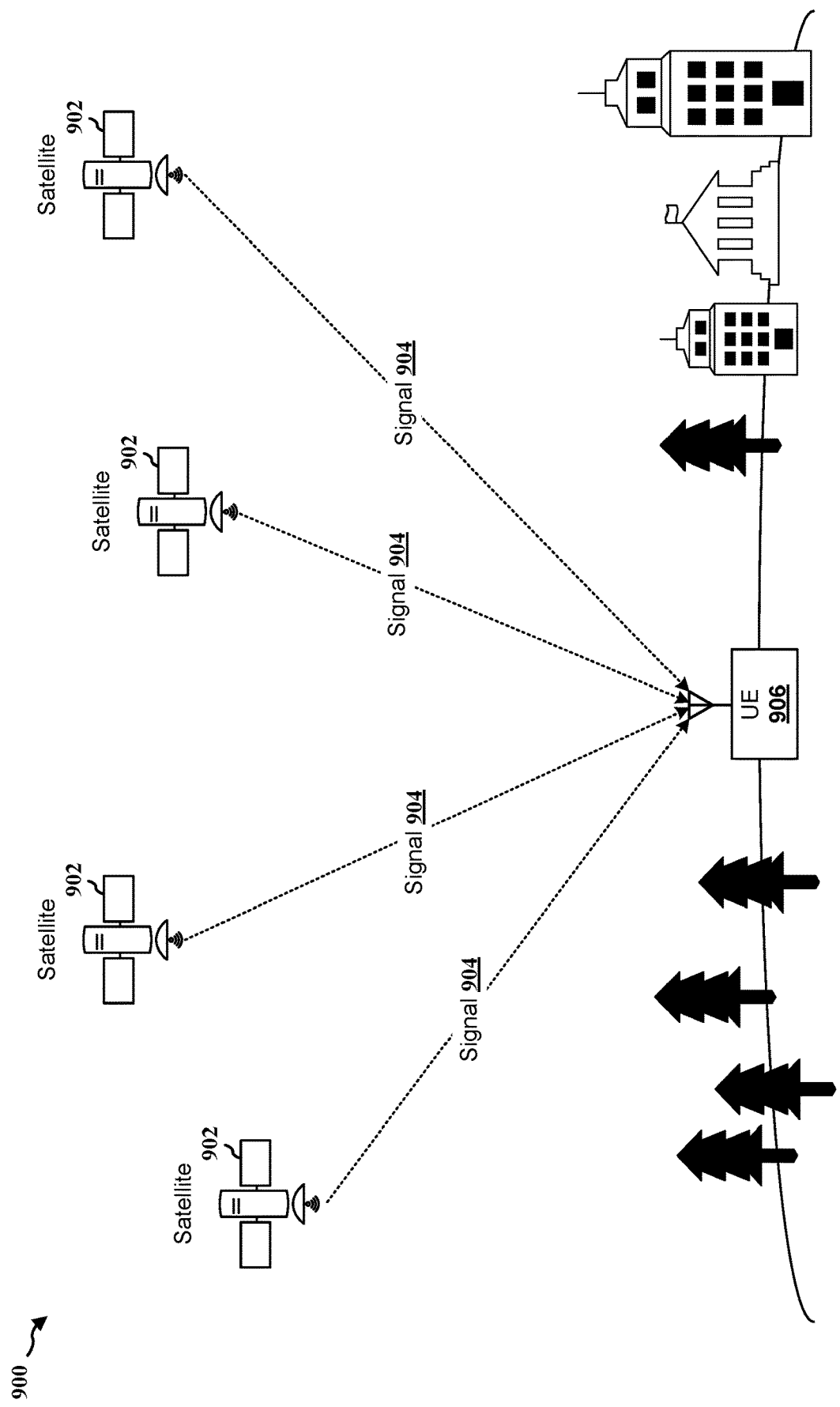
FIG. 9 is a diagram illustrating an example of global navigation satellite system (GNSS) positioning in accordance with various aspects of the present disclosure.

FIG. 9 is a diagram 900 illustrating an example of GNSS positioning in accordance with various aspects of the present disclosure. A UE 906 may calculate its position and time based at least in part on data (e.g., GNSS signals 904) received from a set of satellites 902, where each satellite in the set of satellites 902 may carry a record of its position and time and may transmit that data (e.g., the record) to the UE 906. Each satellite may further include a clock that is synchronized with other clocks of satellites and with ground clock(s). If a satellite detects that there is a drift from the time maintained on the ground, the satellite may correct it. The UE 906 may also include a clock, but the clock for the UE 906 may be less stable and precise compared to the clocks for each satellite.

As the speed of radio waves may be constant and independent of the satellite speed, a time delay between a time the satellite transmits a GNSS signal 904 and a time the UE 906 receives the GNSS signal 904 may be proportional to the distance from the satellite to the UE 906. In some examples, a minimum of four satellites may be used by the UE 906 to compute/calculate one or more unknown quantities associated with positioning (e.g., three position coordinates and clock deviation from satellite time, etc.).

Each satellite may broadcast the GNSS signal 904 (e.g., a carrier wave with modulation) continuously that may include a pseudorandom code (e.g., a sequence of ones and zeros) which may be known to the UE 906, and may also include a message that includes a time of transmission and the satellite position at that time (e.g., the ephemeris and almanac data). In other words, each GNSS signal 904 may carry two types of information: time and carrier wave (e.g., a modulated waveform with an input signal to be electromagnetically transmitted). Based on the GNSS signals 904 received from each satellite, the UE 906 may measure the time of arrivals (TOAs) for the GNSS signals 904 and calculate the time of flights (TOFs) for the GNSS signals 904. Then, based on the TOFs, the UE 906 may compute its three-dimensional position and clock deviation, and the UE 906 may determine its position on the Earth. For example, the UE 906's location may be converted to a latitude, a longitude, and a height relative to an ellipsoidal Earth model. These coordinates may be displayed, such as on a moving map display, or recorded or used by some other system, such as a vehicle guidance system.

Referring back to FIG. 8, at 826, after the UE 802 receives the corresponding encrypted signal(s) 810 and time information 812 from the set of satellites (e.g., the first satellite 806 and up to the $N^{th}$ satellite 808), the UE 802 may generate its own time signals 814 based on the time information 812 received from the set of satellites. For example, the time signals 814 may be based on the time in which the encrypted signal(s) 810 and/or the time information 812 is received by the UE 802.

At 828, the UE 802 may transmit (e.g., via an uplink) the encrypted signal(s) 810 received from the set of satellites and its generated time signals 814 to the network entity 804 (e.g., via one of the satellites), which may include information specified to calculate the position of the UE 802 (e.g., as described in connection with FIG. 9).

At 830, based on the encrypted signal(s) 810 received from the set of satellites and its generated time signals 814, the network entity 804 may determine the location of the UE 802. In other words, instead of letting the UE 802 determining its position based on unencrypted signals received from a set of satellites as described in connection with FIG. 9, the network entity 804 is configured to determine the position of the UE 802 based on the encrypted signal(s) 824 received by the UE 802 from the set of satellites and also the time signals 814 generated by the UE 802. Then, based on the determined location of the UE 802, the network entity 804 may provide the corresponding network service to the UE 802. For example, if the UE 802 is detected/determined to be at a first country/region, the network entity 804 may provide network services and policies associated with the first country/region. On the other hand, if the UE 802 is determined to be at a country/region that is barred from using the network, the network entity 804 may deny UE 802's access to the network.

As the UE 802 does not know the encrypted signal(s) 810, if the UE 802 try to manipulate the UE generated time signals 814, the UE 802 may end up showing on a non-converging location (or a totally wrong/different/bizarre location) when the network entity 804 is trying to calculate the location of the UE 802 based on the encrypted signals(s) 810 and the generated time signals 814 that has been manipulated by the UE 802. As such, aspects presented herein may provide a reliable mechanism for a network entity to determine a location of the UE, such as the location of a UE accessing an NTN.

Figure 10:
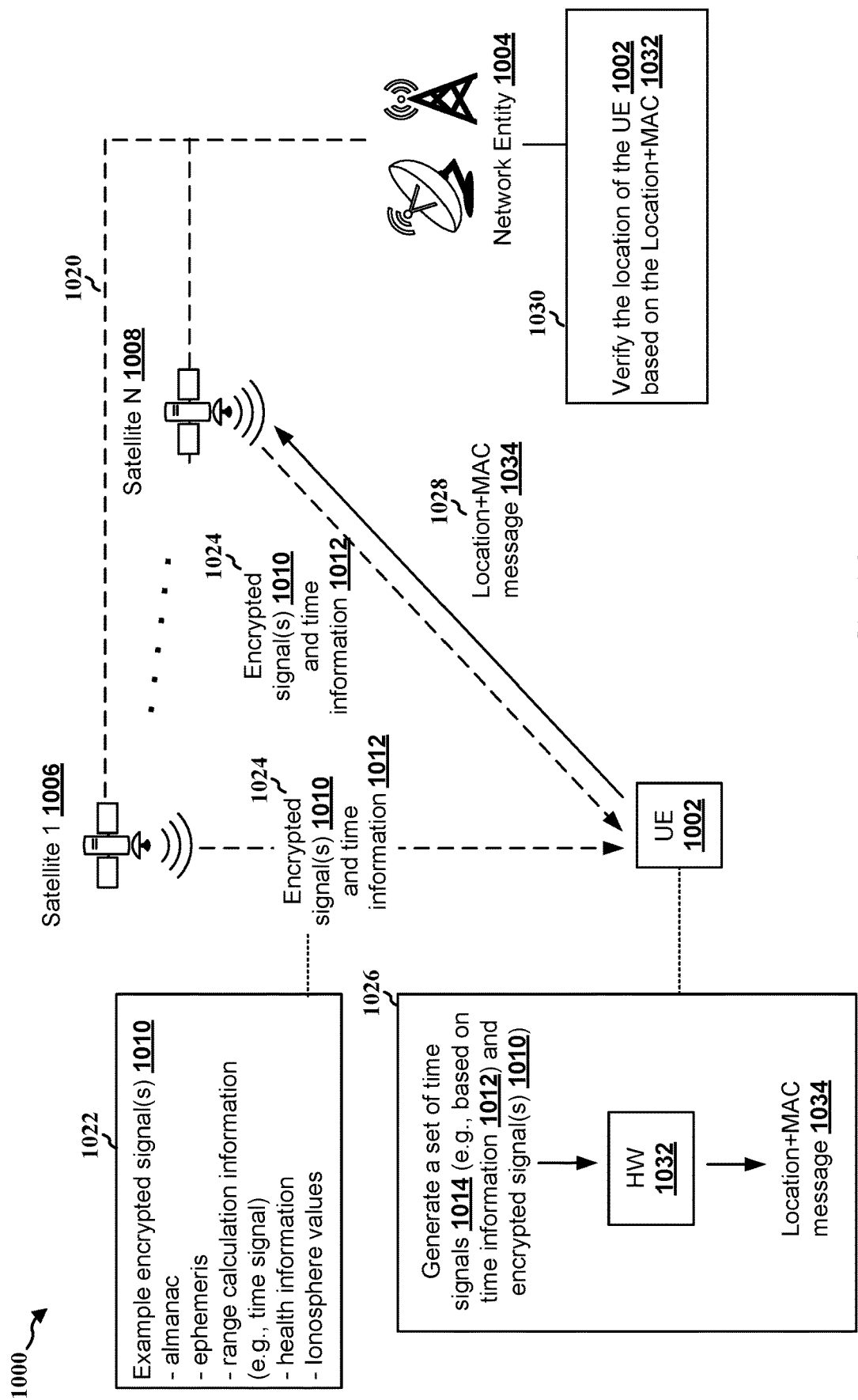
FIG. 10 is a diagram illustrating an example of configuring a UE to determine its location based on encrypted sequences/signals from a set of satellites in accordance with various aspects of the present disclosure.

FIG. 10 is a diagram 1000 illustrating an example of configuring a UE to determine its location based on encrypted sequences/signals from a set of satellites in accordance with various aspects of the present disclosure. In another aspect of the present disclosure, a network may send encrypted sequence from a set of satellites, where the encrypted sequence may include encrypting one or more of almanac, ephemeris, range calculation information, health information, and/or ionosphere values associated with each satellite. A UE may receive the encrypted sequences/signals from the set of satellites, and the UE may send/pass the encrypted sequences/signals and UE's generated time signals to a hardware (HW) block/entity (e.g., a component of the UE) in which the UE does not have control (e.g., a proprietary component not accessible by the UE). In response, this HW block/entity may determine the location of the UE based on the encrypted sequences/signals and the UE generated time signals, and the HW block/entity may return the determined location of the UE with a unique message authentication code (MAC) to the UE (e.g., LOCATION+MAC). After the UE sends the determined location of the UE with the unique message authentication code, the network entity may verify whether the location of the UE is valid based on the unique message authentication code. For example, the network entity may generate the unique message authentication code and determine whether it matches with the one provided by the UE. If the UE changes the location information, then the message authentication code will fail, and the network entity may consider the location of the UE to be invalid. In some examples, for the location of the UE to be valid, the location may correspond to a specified location, a specified geographical region/country, an expected location of the UE, a location threshold (e.g., within X km of a specified location), or a combination thereof. If the location of the UE does not meet the criteria/condition specified, then the location of the UE may be determined to be invalid.

For example, as shown at 1020, a network entity 1004 may be configured to transmit encrypted signal(s) 1010 via a set of satellites (or configured the set of satellites to transmit encrypted signal(s) 1010), which may include a first satellite 1006 and up to an $N^{th}$ satellite 1008. In some examples, as shown at 1022, the encrypted signal(s) 1010 may be based on applying an encryption to: an almanac data, an ephemeris data, range calculation information, a time signal, health information, and/or a set of ionosphere values associated with each satellite. The encrypted signal(s) 1010 may prevent the UE 1002 from manipulating signals received from the set of satellites. Then, as shown at 1024, each satellite in the set of satellites may transmit/broadcast the encrypted signal(s) 1010 and its corresponding time information 1012 (e.g., unencrypted time information).

At 1026, after the UE 1002 receives the corresponding encrypted signal(s) 1010 and the time information 1012 from the set of satellites (e.g., the first satellite 1006 and up to the $N^{th}$ satellite 1008), the UE 1002 may generate its own time signals 1014 based on the time information 1012 received from the set of satellites. For example, the time signals 1014 may be based on the time in which the encrypted signal(s) 1010 and/or the time information 1012 is received by the UE 1002. Then, the UE 1002 may send/pass the encrypted signal(s) 1010 and the generated time signals 1014 to a HW block/entity 1032 (e.g., a component of the UE 1002) in which the UE 1002 does not have control over it (e.g., a proprietary component not accessible by the UE 1002). For purposes of the present disclosure, a HW block/entity in which a UE does not have control over it may refer to a HW block/entity that cannot be modified or altered by the UE, where the UE may just have access to use services provided by the HW block/entity (e.g., providing an input to the HW block/entity and receive a corresponding output or service from the HW block/entity).

After receiving the encrypted signal(s) 1010 and the generated time signals 1014, the HW block/entity 1032 may determine the location of the UE 1002 based on the encrypted signal(s) 1010 and the UE generated time signals 1014, such as described in connection with FIG. 9. Then, the HW block/entity 1032 may return the determined location of the UE 1002 with a unique message authentication code (e.g., a LOCATION+MAC message 1034) to the UE 1002. In some implementations, the HW block/entity 1032 may have the capability to decrypt the encrypted signal(s) 1010, where the HW block/entity 1032 may be provided by or associated with the provider of the network entity 1004. For example, a HW block/entity in which a UE may not have control may include a subscriber identity module (SIM), an embedded SIM (eSIM), or an integrated SIM (iSIM) applet associated with a network provider. A SIM may store information about a subscriber's account or phone subscription. A SIM card may house a chip that allows a UE (e.g., a mobile phone) to communicate with a cell tower. It may also feature an International Mobile Subscriber Identifier (IMSI) that is capable of identifying the UE. In some examples, the SIM card may be responsible for connecting the user to the wireless network, allowing the transmission of calls, text messages, connection to the internet, and more.

At 1028, the UE 1002 may transmit (e.g., via an uplink) the LOCATION+MAC message 1034 provided by the HW block/entity 1032 to the network entity 1004 (e.g., via one of the satellites).

At 1030, after receiving the LOCATION+MAC message 1034 from the UE 1002, the network entity 1004 may verify whether the location provided by the UE 1002 is valid based on the unique message authentication code in the LOCATION+MAC message 1034. For example, the network entity may generate the unique message authentication code (e.g., based on the encrypted signal(s) 1010) and determine whether the generated message authentication code matches with the message authentication code in the LOCATION+MAC message 1034. If they match, the network entity 1004 may determine that the location provided by the UE 1002 (e.g., in the LOCATION+MAC message 1034) is valid, and the network entity 1004 may provide the corresponding network service to the UE 1002 based on the location of the UE 1002. On the other hand, if the message authentication codes do not match (e.g., if the UE 1002 changes its location information, the message authentication code will fail), the network entity 1004 may consider the location of the UE 1002 to be invalid and deny UE 1002's access to the network. In some examples, the message authentication codes may vary based on the sequence numbers, time, and/or location information, where a random value may be replaced by encrypted data/signals received from the set of satellites. As such, aspects presented herein may provide a reliable mechanism for a network entity to determine a location of the UE without UE controlling the output (e.g., the output is processed and generated by a HW block/entity not controlled by the UE).

Figure 11:
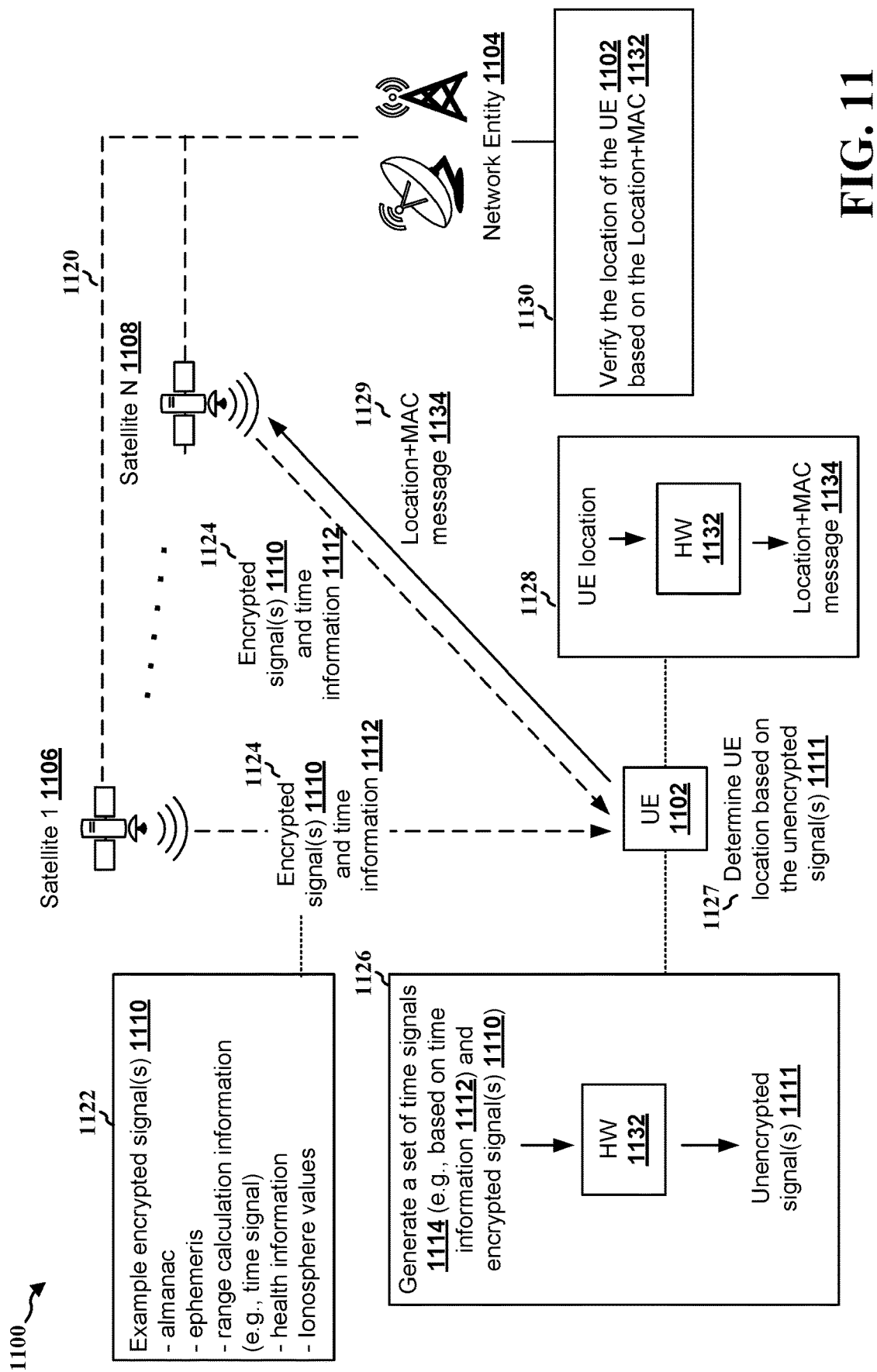
FIG. 11 is a diagram illustrating an example of a network entity verifying a location provided by a UE based on a hardware (HW) block/entity authentication in accordance with various aspects of the present disclosure.

FIG. 11 is a diagram 1100 illustrating an example of a network entity verifying a location provided by a UE based on a HW block/entity (e.g., SIM) authentication in accordance with various aspects of the present disclosure. In another aspect of the present disclosure, a network may send encrypted sequence from a set of satellites, where the encrypted sequence may include encrypting one or more of almanac, ephemeris, range calculation information, health information, and/or ionosphere values associated with each satellite. A UE may receive the encrypted sequences/signals from the set of satellites, and a HW block/entity (e.g., a SIM applet) running in the UE may validate the position calculated by the UE. For example, the UE may send the encrypted sequences/signals and its generated time signals to the HW block/entity, and the HW block/entity may decode/decrypt the encrypted sequences/signals and send the decoded/decrypted sequences/signals back to the UE. The UE may then determine its location based on the decoded/decrypted sequences/signals. The UE may again pass the determined positioning information to the HW block/entity, and the HW block/entity may combine doublet information (e.g., the encrypted sequences/signals) and positioning information, and then generate encrypted message having a MAC code. The UE may send the encrypted message having the MAC code to the network entity, and the network entity may decrypt the message and find the UE location. The network entity may verify the MAC code and then calculate the positioning information from doublet information to see if the UE provided location and network generated time are the same.

For example, as shown at 1120, a network entity 1104 may be configured to transmit encrypted signal(s) 1110 via a set of satellites (or configured the set of satellites to transmit encrypted signal(s) 1110), which may include a first satellite 1106 and up to an $N^{th}$ satellite 1108. In some examples, as shown at 1122, the encrypted signal(s) 1110 may be based on applying an encryption to: an almanac data, an ephemeris data, range calculation information, a time signals, health information, and/or a set of ionosphere values associated with each satellite. The encrypted signal(s) 1110 may prevent the UE 1102 from manipulating signals received from the set of satellites. Then, as shown at 1124, each satellite in the set of satellites may transmit/broadcast the encrypted signal(s) 1110 and its corresponding time information 1112 (e.g., unencrypted time information).

At 1126, after the UE 1102 receives the corresponding encrypted signal(s) 1110 and the time information 1112 from the set of satellites (e.g., the first satellite 1106 and up to the $N^{th}$ satellite 1108), the UE 1102 may generate its own time signals 1114 based on the time information 1112 received from the set of satellites. For example, the time signals 1114 may be based on the time in which the encrypted signal(s) 1110 and/or the time information 1112 is received by the UE 1102. Then, the UE 1102 may send/pass the encrypted signal(s) 1110 and the generated time signals 1114 to a HW block/entity 1132 (e.g., a component of the UE 1102) in which the UE 1102 does not have control over it (e.g., a SIM applet). In response, the HW block/entity 1132 may decode/decrypted the encrypted signal(s) 1110 and generate a set of unencrypted signal(s) 1111, and send the unencrypted signal(s) 1111 to the UE 1102. The HW block/entity 1132 may be provided by or associated with the provider of the network entity 1104 and have the capability to decrypt the encrypted signal(s) 1110.

At 1127, the UE 1102 may determine its location based on the unencrypted signal(s) 1111, such as described in connection with FIG. 9. For example, instead of receiving unencrypted signal(s) from a set of satellite as shown by FIG. 9, the UE 1102 is receiving a set of encrypted signal(s) from a set of satellite, but the set of encrypted signal(s) are decrypted by a HW block/entity (e.g., the HW block/entity 1132, a SIM applet, etc.) in the UE 1102 in which the UE 1102 does not have control over it. Also, the configuration described herein may be different from the configuration described in connection with FIG. 10 as the HW block/entity 1132 is not specified to determine the location of the UE 1102. As such, a simpler/lower complexity HW block/entity may be used for the UE 1102 compared to the HW block/entity used in FIG. 10 (which is configured to determine the location of the UE). In other words, a more advanced or power HW block/entity (e.g., a HW block/entity with the capability to compute the location of a UE) may be specified for the configuration discussed in connection with FIG. 10

At 1128, the UE 1102 may transmit the determined UE location to the HW block/entity 1132, and the HW block/entity 1132 may generate a message that includes the location of the UE 1102 and a unique message authentication code (e.g., a LOCATION+MAC message 1134). Then, at 1129, the UE 1102 may transmit (e.g., via an uplink) the LOCATION+MAC message 1134 to the network entity 1104 (e.g., via one of the satellites).

At 1130, after receiving the LOCATION+MAC message 1134 from the UE 1102, the network entity 1104 may verify whether the location provided by the UE 1102 is valid based on the unique message authentication code in the LOCATION+MAC message 1134. In one example, the network entity may generate the unique message authentication code (e.g., based on the encrypted signal(s) 1110) and determine whether the generated message authentication code matches with the message authentication code in the LOCATION+MAC message 1134. If they match, the network entity 1104 may determine that the location provided by the UE 1102 (e.g., in the LOCATION+MAC message 1134) is valid, and the network entity 1104 may provide the corresponding network service to the UE 1102 based on the location of the UE 1102.

In another example, or as an alternative, the network entity 1104 may decrypt the LOCATION+MAC message 1134 (e.g., using the generated message authentication code), and the network entity 1104 may verify the message authentication code in the LOCATION+MAC message 1134 and/or calculate the location of the UE 1102 based on information in the LOCATION+MAC message 1134 (e.g., the LOCATION+MAC message 1134 may also include the encrypted signal(s) 1110 or the unencrypted signal(s) 1111 received by the UE 1002). Then, the network entity 1104 may compare the location provided by the UE 1102 with its calculated location and determine whether they match. If the locations match, the network entity 1104 may determine that the location provided by the UE 1102 (e.g., in the LOCATION+MAC message 1134) is valid, and the network entity 1104 may provide the corresponding network service to the UE 1102 based on the location of the UE 1102.

On the other hand, if the message authentication codes or the locations do not match, the network entity 1104 may consider the location of the UE 1102 to be invalid and deny UE 1102's access to the network. In some examples, the message authentication codes may vary based on the sequence numbers, time, and/or location information, where a random value may be replaced by encrypted data/signals received from the set of satellites. As such, aspects presented herein may provide a reliable mechanism for a network entity to determine a location of the UE based on authentications performed by a HW block/entity.

In another aspect of the present disclosure, aspects described in connection with FIGS. 8, 10, and 11 (e.g., the UE location verification mechanisms) may be triggered by a network entity (e.g., the network entity 804, 1004, and 1104) based on certain conditions. For example, a UE (e.g., the UE 802, 1002, and 1102) may provide its location to the network entity, such as based on GNSS positioning. If the network entity determines to challenge or verify the UE provided location, then the network entity may use at least one of the mechanisms described in connection with FIGS. 8, 10, and 11. For example, the network entity may send a list of satellite (e.g., the first satellite and up to the $N^{th}$ satellite), and request the UE to measure the encrypted signal(s) and generate its own time signals. Then, the network entity may verify the location of provided the UE (e.g., based on a message authentication code) or determine the location of the UE (e.g., based on the encrypted signal(s) and time signals generated by the UE), such as described in connection with FIGS. 8, 10, and 11. If the UE provided location and the network calculated location are the same or within a permissible accuracy, then the UE may be deemed to be at a valid location.

Aspects described herein provide reliable ways for a network entity such as an NTN to verify a location of a UE, thereby enabling the NTN to provide services (or refrained from providing services) to the UE based on the location of the UE. By enabling satellites associated with an NTN to send encrypted almanac/ephemeris data as opposed to transparent data, a UE may not be able to know the location of these satellites. Also, by enabling the satellites to send encrypted time information (e.g., the time the satellites transmit their GNSS signals), a UE may not use the time information to calculate its position. For configurations that are associated with a HW block/entity (e.g., a SIM/eSIM/iSIM applet), such as described in connection with FIGS. 10 and 11, the HW block/entity may run the logic of which data is used for calculating the positioning information from the UE side before providing the decoded time signals for the positioning information. Thus, the NTN may be able to verify the positioning information provided by the UE by running the algorithm and comparing with UE provided value. As described in connection with FIGS. 10 and 11, some of the positioning calculation may be performed by the HW block/entity. By configuring a UE to provide information used for positioning calculation to the network with a message authentication code (MAC) generated by the HW block/entity, the location determination process performed by the UE or the network entity may become tamper proof. For example, by enabling the NTN capable of calculating the position of the UE based on UE provided encrypted values (e.g., the encrypted signals) may make the UE unable to tamper any of the values, thereby providing a tamper proof time signal with message authentication code integrity protection/cipher protected.

Figure 12:
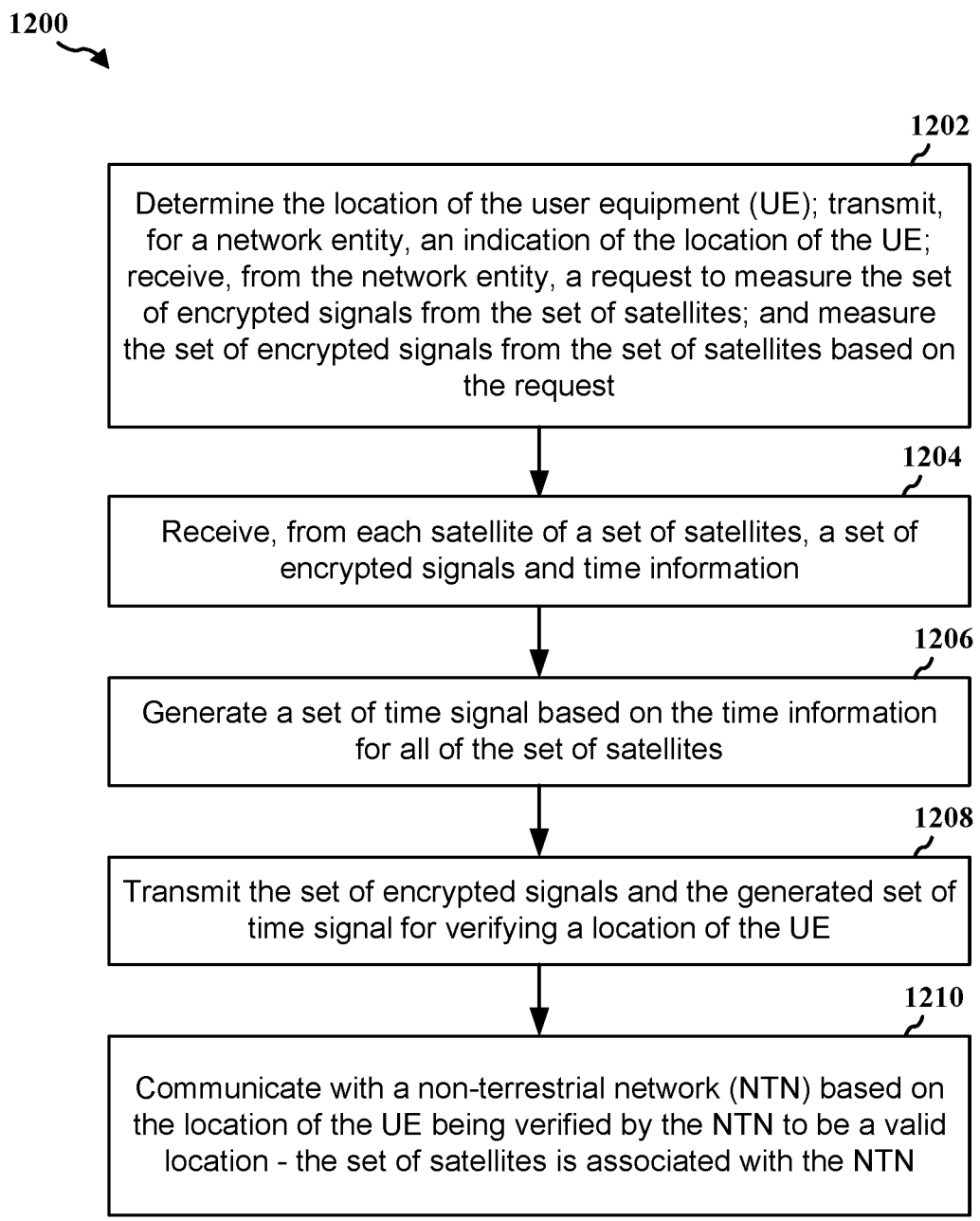
FIG. 12 is a flowchart of a method of wireless communication.

FIG. 12 is a flowchart 1200 of a method of wireless communication. The method may be performed by a UE (e.g., the UE 104, 404, 510, 702, 802, 906, 1002, 1102; the apparatus 1404). The method may enable the UE to communicate with an NTN with its location verified using a set of encrypted signals from a set of satellites associated with the NTN.

At 1204, the UE may receive, from each satellite of a set of satellites, a set of encrypted signals and time information, such as described in connection with FIGS. 8, 10, and 11. For example, as shown at 824 of FIG. 8, the UE 802 may receive encrypted signal(s) 810 and time information 812 from the first satellite 806 and up to the N<sup>th</sup> satellite 808. The means for receiving the set of encrypted signals and time information may be performed by, e.g., the NTN communication component 198, the application processor 1406, the cellular baseband processor 1424, and/or the transceiver(s) 1422 of the apparatus 1404 in FIG. 14.

In one example, the set of encrypted signals is based on applying an encryption to: an almanac data, an ephemeris data, range calculation information, a second set of time signals, health information, a set of ionosphere values, or a combination thereof.

In another example, the set of satellites includes at least four satellites including one or more LEO satellites, one or more GEO satellites, one or more HAPS satellites, or a combination thereof.

At 1206, the UE may generate a set of time signals based on the time information for all of the set of satellites, such as described in connection with FIGS. 8, 10, and 11. For example, as shown at 826 of FIG. 8, the UE 802 may generate a time signals 814 based on the time information 812 from a set of satellites. The means for generating the set of time signals may be performed by, e.g., the NTN communication component 198, the application processor 1406, the cellular baseband processor 1424, and/or the transceiver(s) 1422 of the apparatus 1404 in FIG. 14.

In one example, the set of encrypted signals and the generated set of time signals are transmitted to a network entity for verifying the location of the UE.

At 1208, the UE may transmit the set of encrypted signals and the generated set of time signals for verifying a location of the UE, such as described in connection with FIGS. 8, 10, and 11. For example, as shown at 828 of FIG. 8, the UE 802 may transmit the encrypted signal(s) 810 and the generated time signals 814 to the network entity 804 for verifying the location of the UE 802. The means for transmitting the set of encrypted signals and the generated set of time signals for verifying the location of the UE may be performed by, e.g., the NTN communication component 198, the application processor 1406, the cellular baseband processor 1424, and/or the transceiver(s) 1422 of the apparatus 1404 in FIG. 14.

In one example, the set of encrypted signals and the generated set of time signals are transmitted to a SIM or a hardware entity in which the UE does not have control. The UE may receive the location of the UE and a message authentication code (MAC) from the SIM or the hardware entity; transmit, for a network entity, an indication of the location of the UE and the MAC for verifying the location of the UE; and communicate with the network entity based on the location of the UE being verified by the network entity to be a valid location. In some implementations, the MAC is generated based on the set of encrypted signals.

In another example, the set of encrypted signals and the generated set of time signals are transmitted to a SIM. The UE may determine the location of the UE; transmit, for the SIM, an indication of the location of the UE; receive, from the SIM, a MAC that is generated based on one or more of the set of encrypted signals, the generated set of time signals, or the location of the UE; transmit, for a network entity, the location of the UE and the MAC for verifying the location of the UE; and communicate with the network entity based on the location of the UE being verified by the network entity to be a valid location.

At 1210, the UE may communicate with an NTN based on the location of the UE being verified by the NTN to be a valid location, where the set of satellites is associated with the NTN, such as described in connection with FIGS. 8, 10, and 11. For example, as discussed in connection with FIG. 8, if the UE 802 is detected/determined to be at a first country/region, the network entity 804 may provide network services and policies associated with the first country/region. On the other hand, if the UE 802 is determined to be at a country/region that is barred from using the network, the network entity 804 may deny UE 802's access to the network. The means for communicating with an NTN may be performed by, e.g., the NTN communication component 198, the application processor 1406, the cellular baseband processor 1424, and/or the transceiver(s) 1422 of the apparatus 1404 in FIG. 14.

In one example, the valid location corresponds to a specified location, a specified geographical region, an expected location of the UE, a location threshold, or a combination thereof.

At 1202, the UE may determine the location of the UE; transmit, for a network entity, an indication of the location of the UE; receive, from the network entity, a request to measure the set of encrypted signals from the set of satellites; and measure the set of encrypted signals from the set of satellites based on the request, such as described in connection with FIGS. 8, 10, and 11. For example, as discussed in connection with FIGS. 8, 10, 11, a UE (e.g., the UE 802, 1002, and 1102) may provide its location to the network entity, such as based on GNSS positioning. If the network entity determines to challenge or verify the UE provided location, then the network entity may request the UE to measure the encrypted signal(s) and generate its own time signals. The means for determining the location of the UE, transmitting the indication of the location of the UE, receiving the request to measure the set of encrypted signals from the set of satellites, and/or measuring the set of encrypted signals from the set of satellites based on the request may be performed by, e.g., the NTN communication component 198, the application processor 1406, the cellular baseband processor 1424, and/or the transceiver(s) 1422 of the apparatus 1404 in FIG. 14.

Figure 13:
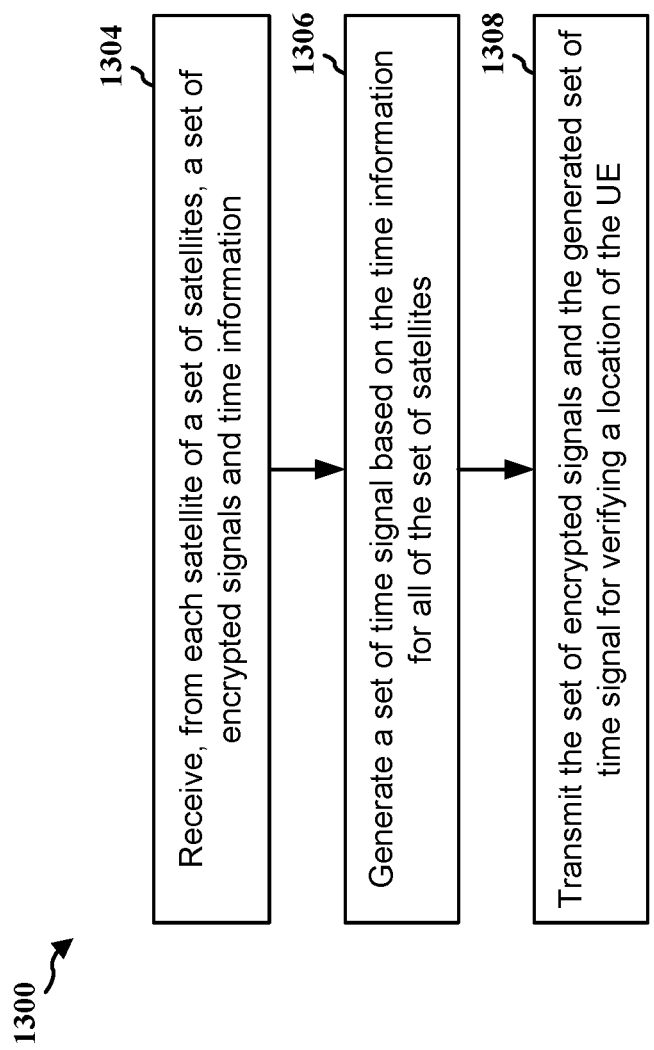
FIG. 13 is a flowchart of a method of wireless communication.

FIG. 13 is a flowchart 1300 of a method of wireless communication. The method may be performed by a UE (e.g., the UE 104, 404, 510, 702, 802, 906, 1002, 1102; the apparatus 1404). The method may enable the UE to communicate with an NTN with its location verified using a set of encrypted signals from a set of satellites associated with the NTN.

At 1304, the UE may receive, from each satellite of a set of satellites, a set of encrypted signals and time information, such as described in connection with FIGS. 8, 10, and 11. For example, as shown at 824 of FIG. 8, the UE 802 may receive encrypted signal(s) 810 and time information 812 from the first satellite 806 and up to the N$^{th}$ satellite 808. The means for receiving the set of encrypted signals and time information may be performed by, e.g., the NTN communication component 198, the application processor 1406, the cellular baseband processor 1424, and/or the transceiver(s) 1422 of the apparatus 1404 in FIG. 14.

In one example, the set of encrypted signals is based on applying an encryption to: an almanac data, an ephemeris data, range calculation information, a second set of time signals, health information, a set of ionosphere values, or a combination thereof.

In another example, the set of satellites includes at least four satellites including one or more LEO satellites, one or more GEO satellites, one or more HAPS satellites, or a combination thereof.

At 1306, the UE may generate a set of time signals based on the time information for all of the set of satellites, such as described in connection with FIGS. 8, 10, and 11. For example, as shown at 826 of FIG. 8, the UE 802 may generate a time signals 814 based on the time information 812 from a set of satellites. The means for generating the set of time signals may be performed by, e.g., the NTN communication component 198, the application processor 1406, the cellular baseband processor 1424, and/or the transceiver(s) 1422 of the apparatus 1404 in FIG. 14.

In one example, the set of encrypted signals and the generated set of time signals are transmitted to a network entity for verifying the location of the UE.

At 1308, the UE may transmit the set of encrypted signals and the generated set of time signals for verifying a location of the UE, such as described in connection with FIGS. 8, 10, and 11. For example, as shown at 828 of FIG. 8, the UE 802 may transmit the encrypted signal(s) 810 and the generated time signals 814 to the network entity 804 for verifying the location of the UE 802. The means for transmitting the set of encrypted signals and the generated set of time signals for verifying the location of the UE may be performed by, e.g., the NTN communication component 198, the application processor 1406, the cellular baseband processor 1424, and/or the transceiver(s) 1422 of the apparatus 1404 in FIG. 14.

In one example, the set of encrypted signals and the generated set of time signals are transmitted to a SIM or a hardware entity in which the UE does not have control. The UE may receive the location of the UE and a message authentication code (MAC) from the SIM or the hardware entity; transmit, for a network entity, an indication of the location of the UE and the MAC for verifying the location of the UE; and communicate with the network entity based on the location of the UE being verified by the network entity to be a valid location. In some implementations, the MAC is generated based on the set of encrypted signals.

In another example, the set of encrypted signals and the generated set of time signals are transmitted to a SIM. The UE may determine the location of the UE; transmit, for the SIM, an indication of the location of the UE; receive, from the SIM, a MAC that is generated based on one or more of the set of encrypted signals, the generated set of time signals, or the location of the UE; transmit, for a network entity, the location of the UE and the MAC for verifying the location of the UE; and communicate with the network entity based on the location of the UE being verified by the network entity to be a valid location.

In another example, the UE may communicate with an NTN based on the location of the UE being verified by the NTN to be a valid location, where the set of satellites is associated with the NTN, such as described in connection with FIGS. 8, 10, and 11. For example, as discussed in connection with FIG. 8, if the UE 802 is detected/determined to be at a first country/region, the network entity 804 may provide network services and policies associated with the first country/region. On the other hand, if the UE 802 is determined to be at a country/region that is barred from using the network, the network entity 804 may deny UE 802's access to the network. The means for communicating with an NTN may be performed by, e.g., the NTN communication component 198, the application processor 1406, the cellular baseband processor 1424, and/or the transceiver(s) 1422 of the apparatus 1404 in FIG. 14.

In another example, the valid location corresponds to a specified location, a specified geographical region, an expected location of the UE, a location threshold, or a combination thereof.

In another example, the UE may determine the location of the UE; transmit, for a network entity, an indication of the location of the UE; receive, from the network entity, a request to measure the set of encrypted signals from the set of satellites; and measure the set of encrypted signals from the set of satellites based on the request, such as described in connection with FIGS. 8, 10, and 11. For example, as discussed in connection with FIGS. 8, 10, 11, a UE (e.g., the UE 802, 1002, and 1102) may provide its location to the network entity, such as based on GNSS positioning. If the network entity determines to challenge or verify the UE provided location, then the network entity may request the UE to measure the encrypted signal(s) and generate its own time signals. The means for determining the location of the UE, transmitting the indication of the location of the UE, receiving the request to measure the set of encrypted signals from the set of satellites, and/or measuring the set of encrypted signals from the set of satellites based on the request may be performed by, e.g., the NTN communication component 198, the application processor 1406, the cellular baseband processor 1424, and/or the transceiver(s) 1422 of the apparatus 1404 in FIG. 14.

Figure 14:
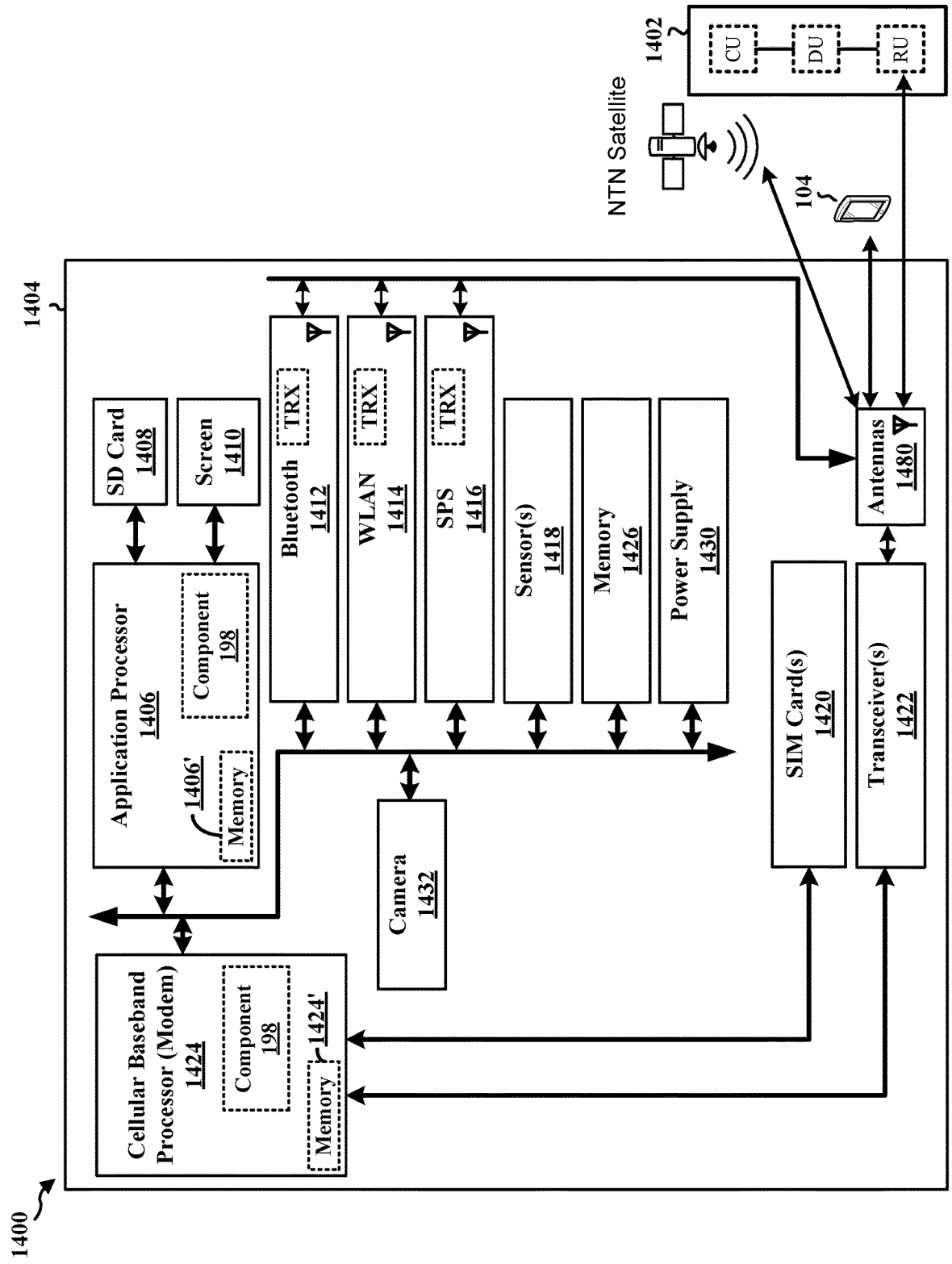
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see UE 350 of FIG. 3) and include the additional modules of the apparatus 1404.

As discussed supra, the NTN communication component 198 may be configured to receive, from each satellite of a set of satellites, a set of encrypted signals and time information. The NTN communication component 198 may also be configured to generate a set of time signals based on the time information for all of the set of satellites. The NTN communication component 198 may also be configured to transmit the set of encrypted signals and the generated set of time signals for verifying a location of the UE. The NTN communication component 198 may be within the cellular baseband processor 1424, the application processor 1406, or both the cellular baseband processor 1424 and the application processor 1406. The NTN communication component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, may include means for receiving, from each satellite of a set of satellites, a set of encrypted signals and time information. The apparatus 1404 may further include means for generating a set of time signals based on the time information for all of the set of satellites. The apparatus 1404 may further include means for transmitting the set of encrypted signals and the generated set of time signals for verifying a location of the UE.

In one configuration, the set of encrypted signals is based on applying an encryption to: an almanac data, an ephemeris data, range calculation information, a second set of time signals, health information, a set of ionosphere values, or a combination thereof.

In another configuration, the set of satellites includes at least four satellites including one or more LEO satellites, one or more GEO satellites, one or more HAPS satellites, or a combination thereof.

In another configuration, the set of encrypted signals and the generated set of time signals are transmitted to a network entity for verifying the location of the apparatus 1404.

In another configuration, the set of encrypted signals and the generated set of time signals are transmitted to a SIM or a hardware entity in which the UE does not have control. The apparatus 1404 may further include means for receiving the location of the apparatus 1404 and a MAC from the SIM or the hardware entity; means for transmitting, for a network entity, an indication of the location of the UE and the MAC for verifying the location of the UE; and means for communicating with the network entity based on the location of the UE being verified by the network entity to be a valid location. In some implementations, the MAC is generated based on the set of encrypted signals.

In another configuration, the set of encrypted signals and the generated set of time signals are transmitted to a SIM. The apparatus 1404 may further include means for determining the location of the UE; means for transmitting, for the SIM, an indication of the location of the UE; means for receiving, from the SIM, a MAC that is generated based on one or more of the set of encrypted signals, the generated set of time signals, or the location of the UE; means for transmitting, for a network entity, the location of the UE and the MAC for verifying the location of the UE; and means for communicating with the network entity based on the location of the UE being verified by the network entity to be a valid location.

In another configuration, the apparatus 1404 may further include means for communicating with an NTN based on the location of the UE being verified by the NTN to be a valid location, where the set of satellites is associated with the NTN.

In another configuration, the valid location corresponds to a specified location, a specified geographical region, an expected location of the UE, a location threshold, or a combination thereof.

In another configuration, the apparatus 1404 may further include means for determining the location of the UE; means for transmitting, for a network entity, an indication of the location of the UE; means for receiving, from the network entity, a request to measure the set of encrypted signals from the set of satellites; and means for measuring the set of encrypted signals from the set of satellites based on the request.

The means may be the NTN communication component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
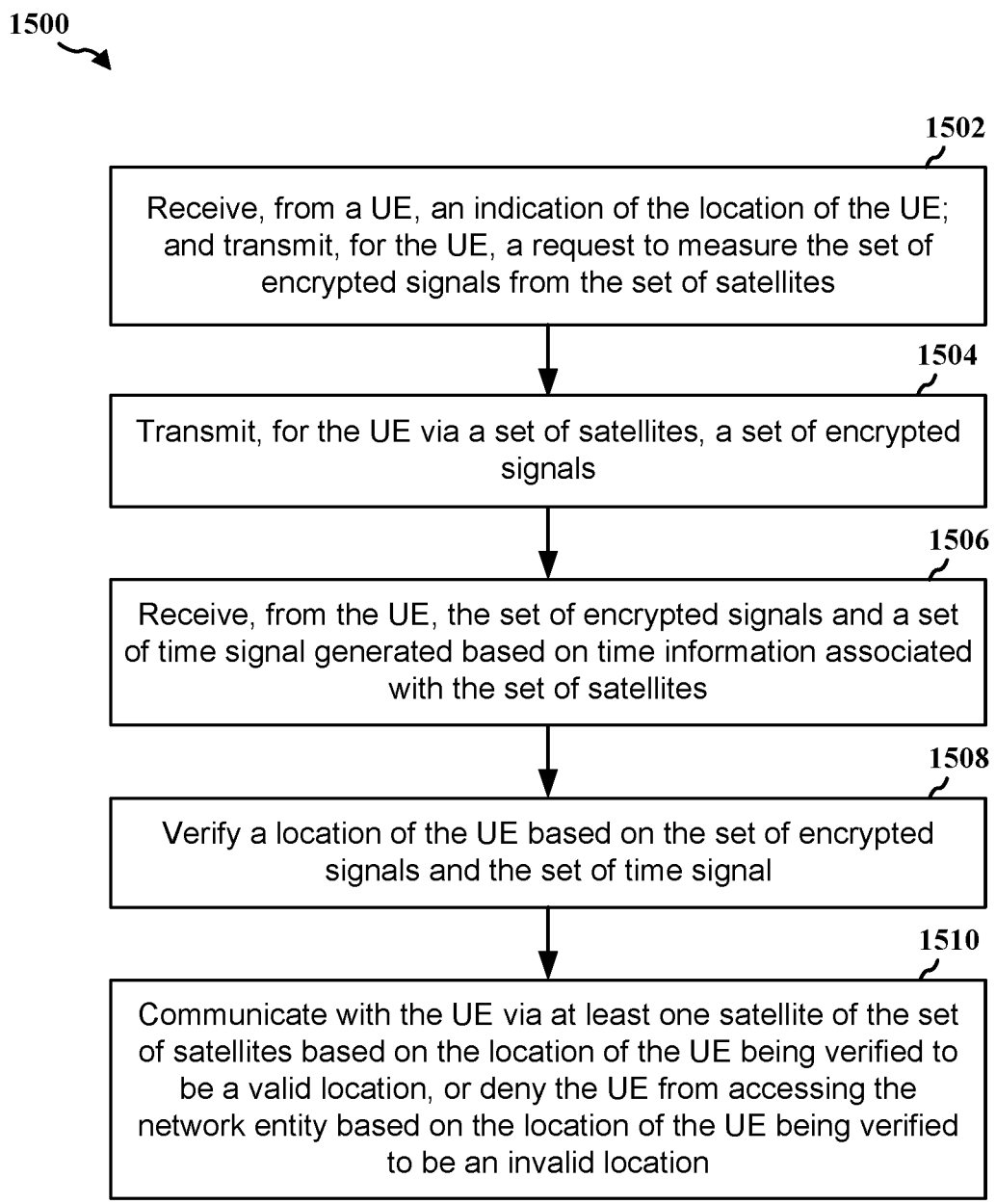
FIG. 15 is a flowchart of a method of wireless communication.

FIG. 15 is a flowchart 1500 of a method of wireless communication. The method may be performed by a network entity (e.g., the base station 102; the network entity 804, 1004, 1104, 1702). The method may enable the network entity to verify the location of a UE and provide network services to the UE based on the location of the UE.

At 1504, the network entity may transmit, for the UE via a set of satellites, a set of encrypted signals, such as described in connection with FIGS. 8, 10, and 11. For example, as shown at 824 of FIG. 8, the network entity 804 may transmit encrypted signals 810 to the UE 802 via a set of satellites. The means for transmitting the set of encrypted signals may be performed by, e.g., the UE location verification component 199, the RU processor 1742, and/or the transceiver(s) 1746 of the network entity 1702 in FIG. 17.

In one example, the set of encrypted signals is based on applying an encryption to: an almanac data, an ephemeris data, range calculation information, a second set of time signals, health information, a set of ionosphere values, or a combination thereof. In another example, the network entity is associated with an NTN.

In another example, the set of satellites includes at least four satellites including one or more LEO satellites, one or more GEO satellites, one or HAPS satellites, or a combination thereof.

At 1506, the network entity may receive, from the UE, the set of encrypted signals and a set of time signals generated based on time information associated with the set of satellites, such as described in connection with FIGS. 8, 10, and 11. For example, as shown at 828 of FIG. 8, the network entity 804 may receive encrypted signals(s) 810 and generated time signals 814 from the UE 802. The means for receiving the set of encrypted signals and the set of time signals may be performed by, e.g., the UE location verification component 199, the RU processor 1742, and/or the transceiver(s) 1746 of the network entity 1702 in FIG. 17.

At 1508, the network entity may verify a location of the UE based on the set of encrypted signals and the set of time signals, such as described in connection with FIGS. 8, 10, and 11. For example, as discussed in connection with FIG. 8, the network entity 804 may determine the location of the UE 802 based on the encrypted signals(s) 810 and generated time signals 814. The means for transmitting the set of encrypted signals may be performed by, e.g., the UE location verification component 199, the RU processor 1742, and/or the transceiver(s) 1746 of the network entity 1702 in FIG. 17.

In one example, to verify the location of the UE based on the set of encrypted signals and the set of time signals, the network entity may calculate the location of the UE based on the set of encrypted signals and the set of time signals.

In another example, the network entity may receive, from the UE, an indication of the location of the UE and a MAC, where the location of the UE and the MAC is generated by a SIM or a hardware entity in which the UE does not have control; and communicate with the UE based on the location of the UE being verified to be a valid location. In some implementations, the MAC is generated based on the set of encrypted signals.

In another example, the network entity may receive, from the UE, an indication of the location of the UE and a MAC, where the MAC is generated by a SIM based on the set of encrypted signals; and communicate with the UE based on the location of the UE being verified to be a valid location and the MAC being authentic.

In another example, to verify the location of the UE based on the set of encrypted signals and the set of time signals, the network entity may calculate a second location of the UE based on the set of encrypted signals and the set of time signals, and the network entity may determine the location of the UE is a valid location based on the second location of the UE is within an accuracy threshold from the location of the UE.

At 1510, the network entity may communicate with the UE via at least one satellite of the set of satellites based on the location of the UE being verified to be a valid location, or deny the UE from accessing the network entity based on the location of the UE being verified to be an invalid location, such as described in connection with FIGS. 8, 10, and 11. For example, as discussed in connection with FIG. 8, based on the determined location of the UE 802, the network entity 804 may provide the corresponding network service to the UE 802. For example, if the UE 802 is detected/determined to be at a first country/region, the network entity 804 may provide network services and policies associated with the first country/region. On the other hand, if the UE 802 is determined to be at a country/region that is barred from using the network, the network entity 804 may deny UE 802's access to the network. The means for communicating with the UE via at least one satellite of the set of satellites and/or the means for denying the UE from accessing the network entity may be performed by, e.g., the UE location verification component 199, the RU processor 1742, and/or the transceiver(s) 1746 of the network entity 1702 in FIG. 17.

In one example, the valid location corresponds to a specified location, a specified geographical region, an expected location of the UE, a location threshold, or a combination thereof.

At 1502, the network entity may receive, from a UE, an indication of the location of the UE; and transmit, for the UE, a request to measure the set of encrypted signals from the set of satellites, such as described in connection with FIGS. 8, 10, and 11. For example, as discussed in connection with FIGS. 8, 10, 11, a UE (e.g., the UE 802, 1002, and 1102) may provide its location to the network entity, such as based on GNSS positioning. If the network entity determines to challenge or verify the UE provided location, then the network entity may request the UE to measure the encrypted signal(s) and generate its own time signals. The means for receiving the location of the UE and/or the means for transmitting the request may be performed by, e.g., the UE location verification component 199, the RU processor 1742, and/or the transceiver(s) 1746 of the network entity 1702 in FIG. 17.

Figure 16:
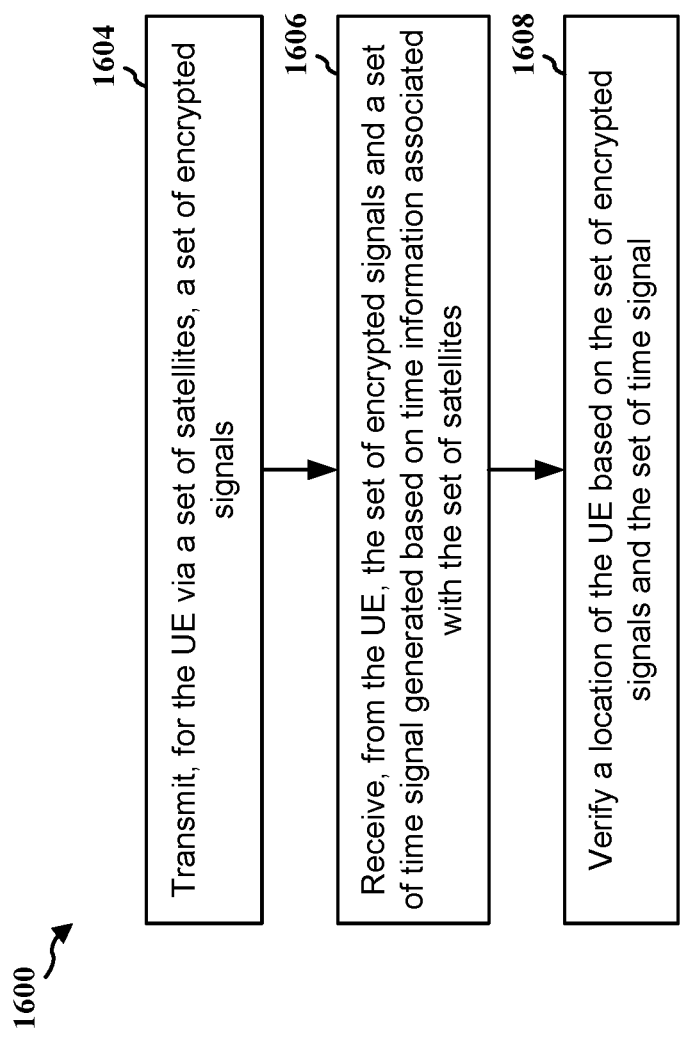
FIG. 16 is a flowchart of a method of wireless communication.

FIG. 16 is a flowchart 1600 of a method of wireless communication. The method may be performed by a network entity (e.g., the base station 102; the network entity

804, 1004, 1104, 1702). The method may enable the network entity to verify the location of a UE and provide network services to the UE based on the location of the UE.

At 1604, the network entity may transmit, for the UE via a set of satellites, a set of encrypted signals, such as described in connection with FIGS. 8, 10, and 11. For example, as shown at 824 of FIG. 8, the network entity 804 may transmit encrypted signals 810 to the UE 802 via a set of satellites. The means for transmitting the set of encrypted signals may be performed by, e.g., the UE location verification component 199, the RU processor 1742, and/or the transceiver(s) 1746 of the network entity 1702 in FIG. 17.

In one example, the set of encrypted signals is based on applying an encryption to: an almanac data, an ephemeris data, range calculation information, a second set of time signals, health information, a set of ionosphere values, or a combination thereof. In another example, the network entity is associated with an NTN.

In another example, the set of satellites includes at least four satellites including one or more LEO satellites, one or more GEO satellites, one or HAPS satellites, or a combination thereof.

At 1606, the network entity may receive, from the UE, the set of encrypted signals and a set of time signals generated based on time information associated with the set of satellites, such as described in connection with FIGS. 8, 10, and 11. For example, as shown at 828 of FIG. 8, the network entity 804 may receive encrypted signals(s) 810 and generated time signals 814 from the UE 802. The means for receiving the set of encrypted signals and the set of time signals may be performed by, e.g., the UE location verification component 199, the RU processor 1742, and/or the transceiver(s) 1746 of the network entity 1702 in FIG. 17.

At 1608, the network entity may verify a location of the UE based on the set of encrypted signals and the set of time signals, such as described in connection with FIGS. 8, 10, and 11. For example, as discussed in connection with FIG. 8, the network entity 804 may determine the location of the UE 802 based on the encrypted signals(s) 810 and generated time signals 814. The means for transmitting the set of encrypted signals may be performed by, e.g., the UE location verification component 199, the RU processor 1742, and/or the transceiver(s) 1746 of the network entity 1702 in FIG. 17.

In one example, to verify the location of the UE based on the set of encrypted signals and the set of time signals, the network entity may calculate the location of the UE based on the set of encrypted signals and the set of time signals.

In another example, the network entity may receive, from the UE, an indication of the location of the UE and a MAC, where the location of the UE and the MAC is generated by a SIM or a hardware entity in which the UE does not have control; and communicate with the UE based on the location of the UE being verified to be a valid location. In some implementations, the MAC is generated based on the set of encrypted signals.

In another example, the network entity may receive, from the UE, an indication of the location of the UE and a MAC, where the MAC is generated by a SIM based on the set of encrypted signals; and communicate with the UE based on the location of the UE being verified to be a valid location and the MAC being authentic.

In another example, to verify the location of the UE based on the set of encrypted signals and the set of time signals, the network entity may calculate a second location of the UE based on the set of encrypted signals and the set of time signals, and the network entity may determine the location of the UE is a valid location based on the second location of the UE is within an accuracy threshold from the location of the UE.

In another example, the network entity may communicate with the UE via at least one satellite of the set of satellites based on the location of the UE being verified to be a valid location, or deny the UE from accessing the network entity based on the location of the UE being verified to be an invalid location, such as described in connection with FIGS. 8, 10, and 11. For example, as discussed in connection with FIG. 8, based on the determined location of the UE 802, the network entity 804 may provide the corresponding network service to the UE 802. For example, if the UE 802 is detected/determined to be at a first country/region, the network entity 804 may provide network services and policies associated with the first country/region. On the other hand, if the UE 802 is determined to be at a country/region that is barred from using the network, the network entity 804 may deny UE 802's access to the network. The means for communicating with the UE via at least one satellite of the set of satellites and/or the means for denying the UE from accessing the network entity may be performed by, e.g., the UE location verification component 199, the RU processor 1742, and/or the transceiver(s) 1746 of the network entity 1702 in FIG. 17.

In another example, the valid location corresponds to a specified location, a specified geographical region, an expected location of the UE, a location threshold, or a combination thereof.

In another example, the network entity may receive, from a UE, an indication of the location of the UE; and transmit, for the UE, a request to measure the set of encrypted signals from the set of satellites, such as described in connection with FIGS. 8, 10, and 11. For example, as discussed in connection with FIGS. 8, 10, 11, a UE (e.g., the UE 802, 1002, and 1102) may provide its location to the network entity, such as based on GNSS positioning. If the network entity determines to challenge or verify the UE provided location, then the network entity may request the UE to measure the encrypted signal(s) and generate its own time signals. The means for receiving the location of the UE and/or the means for transmitting the request may be performed by, e.g., the UE location verification component 199, the RU processor 1742, and/or the transceiver(s) 1746 of the network entity 1702 in FIG. 17.

Figure 17:
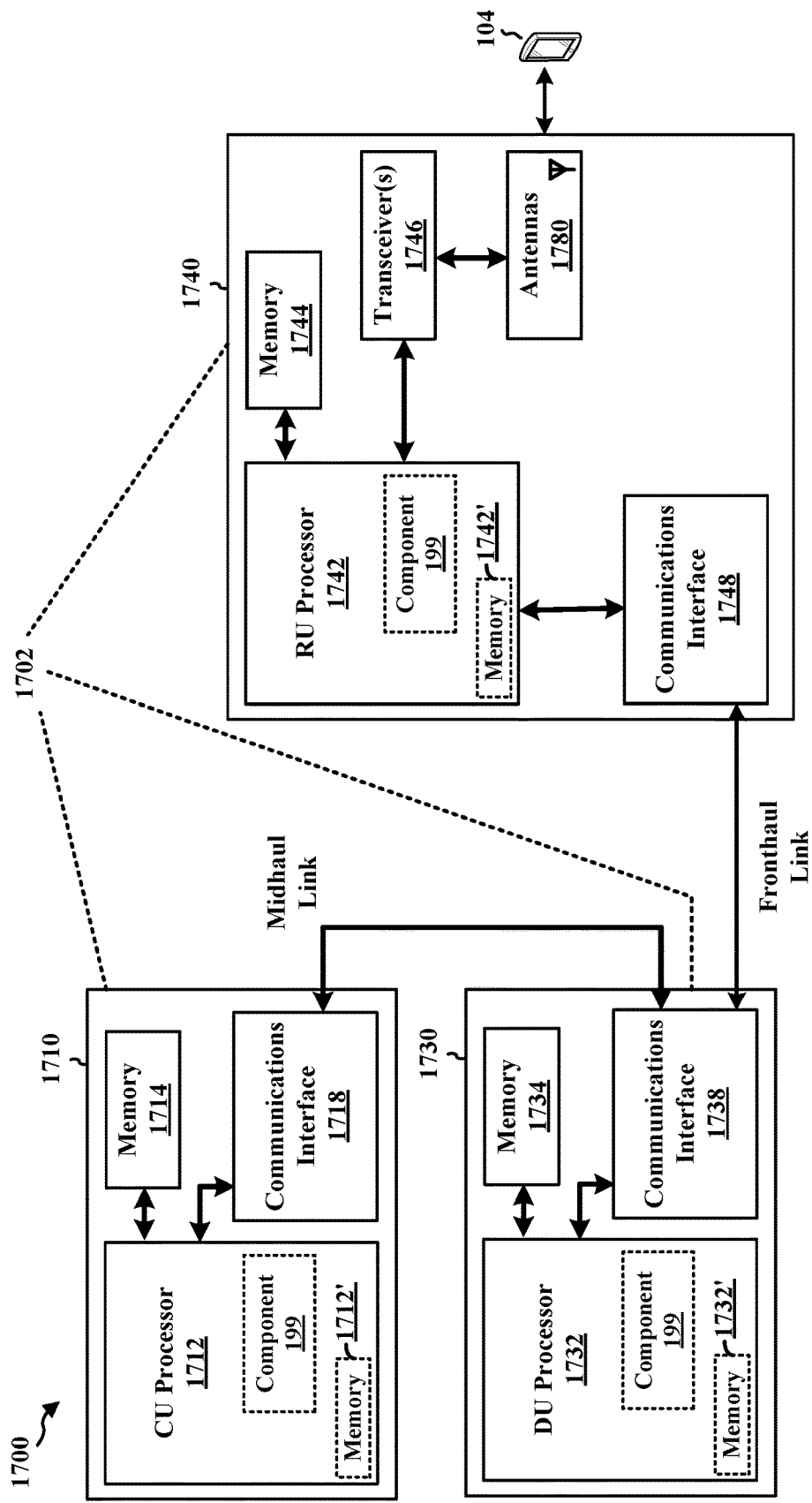
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the UE location verification component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the UE location verification component 199 may be configured to transmit, for a UE via a set of satellites, a set of encrypted signals. The UE location verification component 199 may also be configured to receive, from the UE, the set of encrypted signals and a set of time signals generated based on time information associated with the set of satellites. The UE location verification component 199 may also be configured to verify a location of the UE based on the set of encrypted signals and the set of time signals. The UE location verification component 199 may be within one or more processors of one or more of the CU 1710, DU 1730, and the RU 1740. The UE location verification component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for transmitting, for a UE via a set of satellites, a set of encrypted signals. The network entity 1702 may further include means for receiving, from the UE, the set of encrypted signals and a set of time signals generated based on time information associated with the set of satellites. The network entity 1702 may further include means for verifying a location of the UE based on the set of encrypted signals and the set of time signals.

In one configuration, the set of encrypted signals is based on applying an encryption to: an almanac data, an ephemeris data, range calculation information, a second set of time signals, health information, a set of ionosphere values, or a combination thereof.

In another configuration, the network entity is associated with an NTN.

In another configuration, the set of satellites includes at least four satellites including one or more LEO satellites, one or more GEO satellites, one or HAPS satellites, or a combination thereof.

In another configuration, the means for verifying the location of the UE based on the set of encrypted signals and the set of time signals includes configuring the network entity 1702 to calculate the location of the UE based on the set of encrypted signals and the set of time signals.

In another configuration, the network entity 1702 may further include means for receiving, from the UE, an indication of the location of the UE and a MAC, where the location of the UE and the MAC is generated by a SIM or a hardware entity in which the UE does not have control; and means for communicating with the UE based on the location of the UE being verified to be a valid location. In some implementations, the MAC is generated based on the set of encrypted signals.

In another configuration, the network entity 1702 may further include means for receiving, from the UE, an indication of the location of the UE and a MAC, where the MAC is generated by a SIM based on the set of encrypted signals; and means for communicating with the UE based on the location of the UE being verified to be a valid location and the MAC being authentic.

In another configuration, the means for verifying the location of the UE based on the set of encrypted signals and the set of time signals includes configuring the network entity 1702 to calculate a second location of the UE based on the set of encrypted signals and the set of time signals, and determine the location of the UE is a valid location based on the second location of the UE is within an accuracy threshold from the location of the UE.

In another configuration, the network entity 1702 may further include means for communicating with the UE via at least one satellite of the set of satellites based on the location of the UE being verified to be a valid location, or means for denying the UE from accessing the network entity based on the location of the UE being verified to be an invalid location.

In another configuration, the valid location corresponds to a specified location, a specified geographical region, an expected location of the UE, a location threshold, or a combination thereof.

In another configuration, the network entity 1702 may further include means for receiving, from a UE, an indication of the location of the UE; and means for transmitting, for the UE, a request to measure the set of encrypted signals from the set of satellites.

The means may be the UE location verification component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving, from each satellite of a set of satellites, a set of encrypted signals and time information; generating a set of time signals based on the time information for all of the set of satellites; and transmitting the set of encrypted signals and the generated set of time signals for verifying a location of the UE.

Aspect 2 is the method of aspect 1, where the set of encrypted signals is based on applying an encryption to: an almanac data, an ephemeris data, range calculation information, a second set of time signals, health information, a set of ionosphere values, or a combination thereof.

Aspect 3 is the method of aspect 1 or 2, where the set of encrypted signals and the generated set of time signals are transmitted to a network entity for verifying the location of the UE.

Aspect 4 is the method of any of aspects 1 to 3, further including: communicating with an NTN based on the location of the UE being verified by the NTN to be a valid location, where the set of satellites is associated with the NTN.

Aspect 5 is the method of aspect 4, where the valid location corresponds to a specified location, a specified geographical region, an expected location of the UE, a location threshold, or a combination thereof.

Aspect 6 is the method of any of aspects 1 to 5, where the set of encrypted signals and the generated set of time signals are transmitted to a SIM or a hardware entity in which the UE does not have control, the method further including: receiving the location of the UE and a message authentication code (MAC) from the SIM or the hardware entity; transmitting, for a network entity, an indication of the location of the UE and the MAC for verifying the location of the UE; and communicating with the network entity based on the location of the UE being verified by the network entity to be a valid location.

Aspect 7 is the method of aspect 6, where the MAC is generated based on the set of encrypted signals.

Aspect 8 is the method of any of aspects 1 to 7, where the set of encrypted signals and the generated set of time signals are transmitted to a SIM, the method further including: determining the location of the UE; transmitting, for the SIM, an indication of the location of the UE; receiving, from the SIM, a MAC that is generated based on one or more of the set of encrypted signals, the generated set of time signals, or the location of the UE; transmitting, for a network entity, the location of the UE and the MAC for verifying the location of the UE; and communicating with the network entity based on the location of the UE being verified by the network entity to be a valid location.

Aspect 9 is the method of any of aspects 1 to 8, further including: determining the location of the UE; transmitting, for a network entity, an indication of the location of the UE; receiving, from the network entity, a request to measure the set of encrypted signals from the set of satellites; and measuring the set of encrypted signals from the set of satellites based on the request.

Aspect 10 is the method of any of aspects 1 to 9, where the set of satellites includes at least four satellites including one or more LEO satellites, one or more GEO satellites, one or more HAPS satellites, or a combination thereof.

Aspect 11 is an apparatus for wireless communication at a UE, including: a memory; and at least one processor coupled to the memory and, based at least in part on information stored in the memory, the at least one processor is configured to implement any of aspects 1 to 10.

Aspect 12 is the apparatus of aspect 11, further including at least one of a transceiver or an antenna coupled to the at least one processor.

Aspect 13 is an apparatus for wireless communication including means for implementing any of aspects 1 to 10.

Aspect 14 is a computer-readable medium (e.g., a non-transitory computer-readable medium) storing computer executable code, where the code when executed by a processor causes the processor to implement any of aspects 1 to 10.

Aspect 15 is a method of wireless communication at a network entity, including: transmitting, for a UE via a set of satellites, a set of encrypted signals; receiving, from the UE, the set of encrypted signals and a set of time signals generated based on time information associated with the set of satellites; and verifying a location of the UE based on the set of encrypted signals and the set of time signals.

Aspect 16 is the method of aspect 15, where the set of encrypted signals is based on applying an encryption to: an almanac data, an ephemeris data, range calculation information, a second set of time signals, health information, a set of ionosphere values, or a combination thereof.

Aspect 17 is the method of aspect 15 or 16, where verifying the location of the UE based on the set of encrypted signals and the set of time signals includes: calculating the location of the UE based on the set of encrypted signals and the set of time signals.

Aspect 18 is the method of any of aspects 15 to 17, further including: communicating with the UE via at least one satellite of the set of satellites based on the location of the UE being verified to be a valid location, or denying the UE from accessing the network entity based on the location of the UE being verified to be an invalid location.

Aspect 19 is the method of aspect 18, where the valid location corresponds to a specified location, a specified geographical region, an expected location of the UE, a location threshold, or a combination thereof.

Aspect 20 is the method of any of aspects 15 to 23, further including: receiving, from the UE, an indication of the location of the UE and a MAC, where the location of the UE and the MAC is generated by a SIM or a hardware entity in which the UE does not have control; and communicating with the UE based on the location of the UE being verified to be a valid location.

Aspect 21 is the method of aspect 20, where the MAC is generated based on the set of encrypted signals.

Aspect 22 is the method of any of aspects 15 to 21, further including: receiving, from the UE, an indication of the location of the UE and a MAC, where the MAC is generated by a SIM based on the set of encrypted signals; and communicating with the UE based on the location of the UE being verified to be a valid location and the MAC being authentic.

Aspect 23 is the method of any of aspects 15 to 22, further including: receiving, from the UE, an indication of the location of the UE; and transmitting, for the UE, a request to measure the set of encrypted signals from the set of satellites.

Aspect 24 is the method of any of aspects 15 to 23, where verifying the location of the UE based on the set of encrypted signals and the set of time signals includes: calculating a second location of the UE based on the set of encrypted signals and the set of time signals; and determining the location of the UE is a valid location based on the second location of the UE is within an accuracy threshold from the location of the UE.

Aspect 25 is the method of any of aspects 15 to 24, where the network entity is associated with an NTN.

Aspect 26 is the method of any of aspects 15 to 25, where the set of satellites includes at least four satellites including one or more LEO satellites, one or more GEO satellites, one or HAPS satellites, or a combination thereof.

Aspect 27 is an apparatus for wireless communication at a network entity, including: a memory; and at least one processor coupled to the memory and, based at least in part on information stored in the memory, the at least one processor is configured to implement any of aspects 15 to 26.

Aspect 28 is the apparatus of aspect 27, further including at least one of a transceiver or an antenna coupled to the at least one processor.

Aspect 29 is an apparatus for wireless communication including means for implementing any of aspects 15 to 26.

Aspect 30 is a computer-readable medium (e.g., a non-transitory computer-readable medium) storing computer executable code, where the code when executed by a processor causes the processor to implement any of aspects 15 to 26.

What is claimed is:

1. An apparatus for wireless communication at a user equipment (UE), comprising:
   memory; and
   at least one processor coupled to the memory, and the at least one processor is configured to:
   receive, from each satellite of a set of satellites, a set of encrypted signals and time information, wherein a set of locations of the set of satellites is unknown to the UE;
   generate a set of time signals based on the time information for all of the set of satellites; and
   transmit the set of encrypted signals and the generated set of time signals for verifying a location of the UE.

2. The apparatus of claim 1, wherein the set of encrypted signals is based on applying an encryption to:
   an almanac data,
   an ephemeris data,
   range calculation information,
   a second set of time signals,
   health information,
   a set of ionosphere values, or
   a combination thereof.

3. The apparatus of claim 1, wherein to transmit the set of encrypted signals and the generated set of time signals, the at least one processor is configured to: transmit the set of encrypted signals and the generated set of time signals to a network entity for verifying the location of the UE.

4. The apparatus of claim 1, wherein the at least one processor is further configured to:
   communicate with a non-terrestrial network (NTN) based on the location of the UE being verified by the NTN to be a valid location, wherein the set of satellites is associated with the NTN.

5. The apparatus of claim 4, wherein the valid location corresponds to a specified location, a specified geographical region, an expected location of the UE, a location threshold, or a combination thereof.

6. The apparatus of claim 1, wherein to transmit the set of encrypted signals and the generated set of time signals, the at least one processor is configured to: transmit the set of encrypted signals and the generated set of time signals to a subscriber identity module (SIM) or a hardware entity in which the UE does not have control, wherein the at least one processor is configured to:
   receive the location of the UE and a message authentication code (MAC) from the SIM or the hardware entity;
   transmit, for a network entity, an indication of the location of the UE and the MAC for verifying the location of the UE; and
   communicate with the network entity based on the location of the UE being verified by the network entity to be a valid location.

7. The apparatus of claim 6, wherein the MAC is generated based on the set of encrypted signals.

8. The apparatus of claim 1, wherein to transmit the set of encrypted signals and the generated set of time signals, the at least one processor is configured to: transmit the set of encrypted signals and the generated set of time signals to a subscriber identity module (SIM), wherein the at least one processor is configured to:
determine the location of the UE;
transmit, for the SIM, an indication of the location of the UE;
receive, from the SIM, a message authentication code (MAC) that is generated based on one or more of the set of encrypted signals, the generated set of time signals, or the location of the UE;
transmit, for a network entity, the location of the UE and the MAC for verifying the location of the UE; and
communicate with the network entity based on the location of the UE being verified by the network entity to be a valid location.

9. The apparatus of claim 1, wherein the at least one processor is further configured to:
determine the location of the UE;
transmit, for a network entity, an indication of the location of the UE;
receive, from the network entity, a request to measure the set of encrypted signals from the set of satellites; and
measure the set of encrypted signals from the set of satellites based on the request.

10. The apparatus of claim 1, wherein the set of satellites includes at least four satellites including one or more low-earth orbit (LEO) satellites, one or more geostationary earth orbit (GEO) satellites, one or more high-altitude platform-station (HAPS) satellites, or a combination thereof.

11. A method of wireless communication at a user equipment (UE), comprising:
receiving, from each satellite of a set of satellites, a set of encrypted signals and time information, wherein a set of locations of the set of satellites is unknown to the UE;
generating a set of time signals based on the time information for all of the set of satellites; and
transmitting the set of encrypted signals and the generated set of time signals for verifying a location of the UE.

12. The method of claim 11, wherein the set of encrypted signals and the generated set of time signals are transmitted to a network entity for verifying the location of the UE.

13. The method of claim 11, further comprising:
communicating with a non-terrestrial network (NTN) based on the location of the UE being verified by the NTN to be a valid location, wherein the set of satellites is associated with the NTN.

14. The method of claim 11, wherein the set of encrypted signals and the generated set of time signals are transmitted to a subscriber identity module (SIM) or a hardware entity in which the UE does not have control, the method further comprising:
receiving the location of the UE and a message authentication code (MAC) from the SIM or the hardware entity;
transmitting, for a network entity, an indication of the location of the UE and the MAC for verifying the location of the UE; and
communicating with the network entity based on the location of the UE being verified by the network entity to be a valid location.

15. The method of claim 11, wherein the set of encrypted signals and the generated set of time signals are transmitted to a subscriber identity module (SIM), the method further comprising:
determining the location of the UE;
transmitting, for the SIM, an indication of the location of the UE;
receiving, from the SIM, a message authentication code (MAC) that is generated based on one or more of the set of encrypted signals, the generated set of time signals, or the location of the UE;
transmitting, for a network entity, the location of the UE and the MAC for verifying the location of the UE; and
communicating with the network entity based on the location of the UE being verified by the network entity to be a valid location.

16. An apparatus for wireless communication at a network entity, comprising:
memory; and
at least one processor coupled to the memory, and the at least one processor is configured to:
transmit, for a user equipment (UE) via a set of satellites, a set of encrypted signals, wherein the set of encrypted signals does not indicate a set of locations of the set of satellites;
receive, from the UE, the set of encrypted signals and a set of time signals generated based on time information associated with the set of satellites; and
verify a location of the UE based on the set of encrypted signals and the set of time signals.

17. The apparatus of claim 16, wherein the set of encrypted signals is based on applying an encryption to:
an almanac data,
an ephemeris data,
range calculation information,
a second set of time signals,
health information,
a set of ionosphere values, or
a combination thereof.

18. The apparatus of claim 16, wherein to verify the location of the UE based on the set of encrypted signals and the set of time signals, the at least one processor is configured to:
calculate the location of the UE based on the set of encrypted signals and the set of time signals.

19. The apparatus of claim 16, wherein the at least one processor is further configured to:
communicate with the UE via at least one satellite of the set of satellites based on the location of the UE being verified to be a valid location, or
deny the UE from accessing the network entity based on the location of the UE being verified to be an invalid location.

20. The apparatus of claim 19, wherein the valid location corresponds to a specified location, a specified geographical region, an expected location of the UE, a location threshold, or a combination thereof.

21. The apparatus of claim 16, wherein the at least one processor is further configured to:
receive, from the UE, an indication of the location of the UE and a message authentication code (MAC), wherein the location of the UE and the MAC is generated by a subscriber identity module (SIM) or a hardware entity in which the UE does not have control; and
communicate with the UE based on the location of the UE being verified to be a valid location.

22. The apparatus of claim 21, wherein the MAC is generated based on the set of encrypted signals.

23. The apparatus of claim 16, wherein the at least one processor is further configured to:

receive, from the UE, an indication of the location of the UE and a message authentication code (MAC), wherein the MAC is generated by a subscriber identity module (SIM) based on the set of encrypted signals; and communicate with the UE based on the location of the UE being verified to be a valid location and the MAC being authentic.

24. The apparatus of claim 16, wherein the at least one processor is further configured to:

receive, from the UE, an indication of the location of the UE; and transmit, for the UE, a request to measure the set of encrypted signals from the set of satellites.

25. The apparatus of claim 16, wherein to verify the location of the UE based on the set of encrypted signals and the set of time signals, the at least one processor is configured to:

calculate a second location of the UE based on the set of encrypted signals and the set of time signals; and determine the location of the UE is a valid location based on the second location of the UE is within an accuracy threshold from the location of the UE.

26. The apparatus of claim 16, wherein the network entity is associated with a non-terrestrial network (NTN).

27. The apparatus of claim 16, wherein the set of satellites includes at least four satellites including one or more low-earth orbit (LEO) satellites, one or more geostationary earth orbit (GEO) satellites, one or more high-altitude platform-station (HAPS) satellites, or a combination thereof.

28. A method of wireless communication at a network entity, comprising:

transmitting, for a user equipment (UE) via a set of satellites, a set of encrypted signals, wherein the set of encrypted signals does not indicate a set of locations of the set of satellites;

receiving, from the UE, the set of encrypted signals and a set of time signals generated based on time information associated with the set of satellites; and verifying a location of the UE based on the set of encrypted signals and the set of time signals.

29. The method of claim 28, further comprising:

communicating with the UE via at least one satellite of the set of satellites based on the location of the UE being verified to be a valid location, or denying the UE from accessing the network entity based on the location of the UE being verified to be an invalid location.

30. The method of claim 28, further comprising:

receiving, from the UE, an indication of the location of the UE and a message authentication code (MAC), wherein the location of the UE and the MAC is generated by a subscriber identity module (SIM) or a hardware entity in which the UE does not have control; and communicating with the UE based on the location of the UE being verified to be a valid location.

* * * * *